US011161637B2

(12) United States Patent
Ford et al.

(10) Patent No.: US 11,161,637 B2
(45) Date of Patent: Nov. 2, 2021

(54) CONTINUOUS MOTION PACKAGING MACHINE WITH CARTON TURNING STATION

(71) Applicant: Graphic Packaging International, LLC, Atlanta, GA (US)

(72) Inventors: Colin P. Ford, Woodstock, GA (US); Thomas A. Rice, Dawsonville, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 176 days.

(21) Appl. No.: 16/260,858

(22) Filed: Jan. 29, 2019

(65) Prior Publication Data

US 2019/0233151 A1    Aug. 1, 2019

Related U.S. Application Data

(60) Provisional application No. 62/644,019, filed on Mar. 16, 2018, provisional application No. 62/623,208, filed on Jan. 29, 2018.

(51) Int. Cl.
*B65B 43/42* (2006.01)
*B65B 21/24* (2006.01)
*B65B 43/12* (2006.01)

(52) U.S. Cl.
CPC ............ *B65B 43/42* (2013.01); *B65B 21/242* (2013.01); *B65B 43/126* (2013.01)

(58) Field of Classification Search
CPC ..... B65B 43/42; B65B 21/242; B65B 43/126; B65G 47/244; B65G 47/2445
See application file for complete search history.

(56) References Cited

U.S. PATENT DOCUMENTS 2,499,694 A * 3/1950 Stenger .............. B65G 47/2445
                                                        198/415
2,805,753 A * 9/1957 Palmer ................. B65G 47/244
                                                        198/374
(Continued)

FOREIGN PATENT DOCUMENTS

EP    0 471 450        2/1992
EP    0 849 176 A1     6/1998
(Continued)

OTHER PUBLICATIONS

International Search Report and Written Opinion for PCT/US2019/015597 dated May 17, 2019.

*Primary Examiner* — Nathaniel C Chukwurah
*Assistant Examiner* — Lucas E. A. Palmer
(74) *Attorney, Agent, or Firm* — Womble Bond Dickinson (US) LLP

(57) ABSTRACT

An article packaging machine and method or turning article packs, the article packaging machine having a turner station for turning article packs moving though the packaging machine. The packaging machine includes a main conveyor extending longitudinally from an upstream end to a downstream end and through the turning station. Article packs are carried by the main conveyor spaced and sequentially in the downstream direction through the turner station. The turner station includes flight drive assembly having multiple flight assemblies. The flight assemblies are driven above upper cam plates in the upstream direction, and below lower cam plates in the downstream direction. The flight assemblies include turner rods that are moved toward the main conveyor to contact the article pack in at least two points. The turner rods progressively move toward the main conveyor center line until the distal ends of the turner rods are moved (Continued)

past the article pack side walls and the pack is turned 90 degrees.

30 Claims, 17 Drawing Sheets

(56) References Cited

U.S. PATENT DOCUMENTS

| | | | | |
|---|---|---|---|---|
| 2,984,332 A | * | 5/1961 | Pierce, Jr. | ................. B65B 7/26 198/415 |
| 5,074,400 A | * | 12/1991 | Focke | ..................... B65B 61/24 198/415 |
| 5,209,338 A | * | 5/1993 | Kirtland | ............... B65G 17/005 198/440 |
| 5,343,998 A | * | 9/1994 | Depinet | ............. B65G 47/2445 198/415 |
| 5,657,849 A | * | 8/1997 | Kirtland | ............... B65G 17/005 198/411 |
| 5,673,536 A | | 10/1997 | Easter et al. | |
| 6,202,392 B1 | * | 3/2001 | Greenwell | ............ B65B 25/141 53/117 |
| 6,390,276 B1 | * | 5/2002 | Haug | ........................ B65B 5/06 198/377.01 |
| 6,550,608 B1 | | 4/2003 | Brown et al. | |
| 6,698,163 B2 | * | 3/2004 | Greenwell | ............ B65B 25/141 53/429 |
| 7,503,447 B2 | | 3/2009 | Ford | |
| 7,712,599 B1 | * | 5/2010 | Landrum | ........... B65G 47/2445 198/415 |
| 2001/0039785 A1 | * | 11/2001 | Greenwell | ............ B65B 25/141 53/429 |
| 2007/0186508 A1 | * | 8/2007 | Rovers | .................. B65B 39/007 53/235 |
| 2014/0311091 A1 | * | 10/2014 | Moncrief | ................ B65B 51/02 53/410 |
| 2015/0329231 A1 | * | 11/2015 | Moncrief | .................. B65B 7/18 53/443 |
| 2015/0375880 A1 | * | 12/2015 | Ford | ...................... B65B 49/14 53/443 |
| 2020/0079596 A1 | * | 3/2020 | Frank | ..................... B65B 35/18 |

FOREIGN PATENT DOCUMENTS

| | | |
|---|---|---|
| EP | 0 752 972 B1 | 10/1999 |
| EP | 1 801 014 A1 | 6/2007 |
| JP | 2002-361760 A | 12/2002 |
| WO | WO 99/18020 A1 | 4/1999 |

* cited by examiner

CONTINUOUS MOTION PACKAGING MACHINE WITH CARTON TURNING STATION

CROSS-REFERENCE TO RELATED APPLICATION

This application claims the benefit of U.S. Provisional Patent Application No. 62/623,208, filed Jan. 29, 2018, and U.S. Provisional Patent Application No. 62/644,019, filed Mar. 18, 2018.

INCORPORATION BY REFERENCE

The disclosures of U.S. Provisional Patent Application No. 62/623,208, filed Jan. 29, 2018, and U.S. Provisional Patent Application No. 62/644,019, filed Mar. 18, 2018, are hereby incorporated by reference for all purposes as if presented herein in its entirety.

FIELD OF THE INVENTION

The present invention relates to a carton turning unit especially adapted for a continuous motion packaging machine, and to those packaging machines that incorporate these turning units or stations. Packaging machinery that place products, such as cans, bottles and other containers into cartons, including paperboard cartons, are well known. These packaging machines include, but are not limited to, those which place articles or products into a wrap-type cartons, basket-type cartons or sleeve-type cartons. In some packaging machines, it is desirable to turn or rotate a carton or pack as it travels uninterrupted along a path of travel on a conveyor.

BACKGROUND

One example of a packaging machine that packages articles, such as cans or bottles into a wrap-type carton is the Marksman® brand machines, including the Marksman® MM16HSi brand machine manufactured by Graphic Packaging International, LLC. Other types of packaging machines are especially adapted to package products into sleeve-type or fully enclosed cartons and into basket-type cartons, such as Graphic Packaging International, LLC's Quikflex® and Autoflex® brand machines. Many of these machines include one or more elongate conveyor systems or assemblies that extend from a carton blank feeder positioned at a first end or upstream section, to a second end or downstream section where the filled cartons or packs are discharged. The main conveyor moves articles, such as bottles or cans, and the carton blanks that become filled packs, through the machine toward the downstream or discharge end. Positioned along the main conveyor are various units or stations that incorporate the necessary components that perform required functions with the articles or the carton. For example, in packaging machines designed to process wrap-type cartons, at the upstream section the products are delivered adjacent to the machine in mass, and moved to an article or product selection station where they are grouped into desired configurations, such as a 2 by 3 article group, a 2 by 2 group, 2 by 6 group or a 3 by 4 group of articles. Other group configurations are possible. In a machine that packages articles in a wrap-type carton, a carton blank feeder delivers carton blanks, one at a time, to a station that wraps the blank around a formed article group, such as a group of six articles (a "6 pack") arranged in a 2×3 configuration. These wrap-type carton blanks have a locking assembly, typically tabs and either slits or holes, that cooperate or engage with one another on opposite bottom edges of the carton to close the wrap-type carton blank around the article group. All of these functions occur while the article group is moving continuously in the downstream direction on a main conveyor. Another element, such as a wheel or cam surface can tuck carton flaps to secure the articles into a filled pack. After the carton blanks are wrapped around the product group in this manner, the group is held securely within the now formed and filled carton or pack. As used herein the term "carton blank" refers to either a flat blank or to a carton blank that has been partially constructed, for example by gluing, especially as in sleeve-type and basket-type carton blanks. The term "carton" or "pack" refers to a carton blank that has been fully assembled either around or that contains the articles.

Various Marksman® brand packaging machines have been developed by Graphic Packaging International, LLC and are in commercial use. These machines include features such a product diverter station positioned at the downstream end of the machine, that can divert a packaged carton group or pack into selected lanes for a variety of purposes, such as to direct packs to an area for palletizing. Some packs that do not meet the pack quality requirements are diverted to a pack reject lane. Some Marksman® brand machines also include a pack turning unit that turns or reorients the pack as it is in continuous motion through the machine in the downstream direction. For example, U.S. Pat. No. 7,503,447, incorporated herein in its entirety by reference and assigned by the current applicant, discloses a packaging machine having a main rod-type conveyor system that supports a slat bed, and a filled a pack turner assembly that is at least in part positioned below the main machine conveyor system. A pack divider section also is disclosed. The turner/divider unit disclosed in U.S. Pat. No. 7,503,447, for example, includes pins that extend downwardly from the slats riding on the rod-type continuous motion conveyor, and also pins that project upwardly to contact the sides of the pack. A main conveyor extends essentially the length of the packaging machine downstream of a feeder to the collection tray or to another conveyor. A cam track positioned below the main conveyor and the slats receives the downwardly extending pins to facilitate turning the pack on the slats. The divider section is positioned downstream of the turner unit. Other types of turning units or stations in packaging machines also are well known, including overhead turning units that contact and turn the carton from above the main conveyor using a turner head that engages the top portion of the moving pack, which is then rotated by the overhead assembly. This is shown, for example in EP 0471450 A1. Prior machines also have used the method of turning the pack from below using two different speed belts or conveyors. Principally underside turning is also known that includes pins on slats, as shown in U.S. Pat. No. 5,209,338. This Marksman® brand machine that includes a pack diverter unit or station is capable of moving the packs transversely with respect to the longitudinal direction of operative movement of the main rod conveyor in order to place each pack in the proper position or lane for exiting the machine. Carton blanks adapted to wrap around an article group and machine elements to accomplish that are well known, as shown in U.S. Pat. Nos. 5,673,536 and 6,550,608, both owned by Graphic Packaging International, LLC, the present owner of the inventions disclosed herein and both of which are incorporated in their entirety herein by reference.

SUMMARY

The present invention includes improvements over known packaging machines, the turning assemblies for continuous motion packaging machines, and the method of packaging and turning the packs. The invention disclosed herein utilizes pack turning assemblies having flight drive assemblies positioned on each side of the main conveyor downstream of the article wrapping station where the articles are secured into the carton or pack. This flight drive assembly includes elements, such as flight assemblies having turner rods. Each flight assembly includes turner rods to contact the two sides of a filled carton, or pack, in locations on the sides of the packs that are both upstream and downstream, respectively of the pack center point (top wall center point) as viewed from above the pack. This contact with the turner rods extending progressively transversely to the main conveyor direction and opposing flight drive assemblies will push and so turn the pack on top of the slats. In this operation, the distal ends of the turner rods extend past the pack side walls before being retracted. This extension of the turner rods controls the turning of the pack, especially at high speeds of, for example, 400 packs per minute, and keep the packs from overturning, or turning past the desired amount as shown herein. During the contact of the turner rods with the pack, the flight assemblies that are contacting the moving packs are also being driven progressively in the downstream direction in timed relationship with the packs, which direction is in the downstream moving direction of the main conveyor. The turner rods eventually are retracted and removed from contacting the pack, and driven by drive belts upstream with respect to the conveyor direction, that is, in the opposite direction of the top of the main conveyor that supports the packs, to a starting position to again contact and turn another pack. This upstream movement occurs after the packs have been turned, and the turner rods release contact with the moving packs. The push rods or turner rods are mounted to flight assemblies that travel on belts or chains around the flight drive assembly that supports the belts and allow the belts to move the flight assemblies in timed relationship to the packs moving downstream on the main conveyor during the turning phase of the pack. Numerous flight assemblies spaced at desired locations are carried on the flight drive assembly. For example, with a packaging machine operating to fill approximately 450 six packs in a 2×3 arrangement per minute, there can be 10 flight assemblies on each flight drive assembly. More or less flight assemblies can be included on the flight drive assemblies, depending upon factors such as machine/conveyor speed and pack size and configuration. After the flight assemblies release contact with the respective pack, those flight assemblies are driven back in the upstream direction relative to the conveyor's operative movement to a starting position, in order to repeat the process on another pack.

Each turner rod can be driven inwards and outwards, toward and away from the centerline of the main conveyor. There are identical flight drive assemblies and flight assemblies of the pack turning assembly that are positioned across from each other along the main conveyor at the desired position to turn the pack, that is, typically between the carton blank wrap station and the diverter station and pack accumulation area. If a pack diverter station or unit is included, that diverter unit is position adjacent to the machine discharge end, downstream of the turner unit. The flight drive assembly moves each flight assembly by a drive belt in a path around the elongate flight drive assembly as discussed herein, so that a flight assembly can be positioned to turn a pack, and then moved around the downstream end of the flight drive assembly and then back in an upstream direction to operatively engage another pack as it moves downstream. A turner rod in its operative position in one embodiment of the flight assembly extends toward the pack and is positioned to contact the pack forward or downstream of the pack center point, as defined herein, as the pack moves downstream while the pack is resting on slats. The second or opposite flight drive unit, that is positioned on the opposite side of the main conveyor from the first flight drive unit and also carrying identical flight assemblies, includes cooperating turner rods that extend transversely toward the first flight drive assembly. This second flight drive assembly cooperates with and is timed with a corresponding flight assembly of the first flight drive assembly so that an opposite turner rod of the second flight assembly contacts the same pack rearward or upstream the pack center point. These cooperating turner rods on flight assemblies of opposing flight drive units are positioned so that the space between the respective rods is approximately equal to a pack width, as measured along the pack's shorter side dimension. In, for example, a 2×3 article configured carton that has a shorter side dimension and a longer side dimension, the turner rods contact the pack approximately a pack width both upstream and downstream from the pack center point. In a pack that holds articles in a 2×3 arrangement, the pack exits the carton wrapping assembly with the shorter dimension of the pack oriented downstream. This orientation has the 2 articles leading the pack in the downstream direction, along the longitudinal path of the main conveyor as the pack approaches the pack turner station. A carton pitch station, that includes two pitch drive assemblies having chains or belts that carry spaced lugs in order to create the proper longitudinal distance or pitch between successive packs, include pitch drive assemblies on opposite sides of the main conveyor. The pitch drive assemblies move the spaced lugs faster than the main conveyor speed, so that a lug from each pitch drive assembly contacts a pack simultaneously to accelerate that pack on the slat bed, and so create the proper carton pitch. This carton pitch station is positioned along the main conveyor between the pack wrapping station and the pack turning station.

As the flight assemblies continues to extend the opposing and cooperating turner rods towards the centerline of the main conveyor, to turn the pack, the pack eventually is rotated approximately 90 degrees. After the pack is turned by the cooperating turner rods, the pack now is oriented on the slat bed of the main conveyor with the 2 article side facing in the transverse direction to the longitudinal path of the main conveyor, and the 3 article side facing forward or downstream as the pack continues to move toward the machine's discharge end. Once the pack is fully rotated, the opposing push rods then remain in contact with the upstream side or side wall and the downstream side or side wall, respectively, of the pack, while the pack still is moving downstream on the slat bed by the main conveyor and toward the diverter station adjacent the discharge end of the machine. In this position, the cooperating push rods now stabilize the pack as it continues to move downstream and prevent over turning. The turner rods are then removed from contacting the carton as described herein, or mechanically retracted transversely and away from the conveyor's longitudinal centerline. Such retraction of the turner rods will withdraw these turner rods from an operative position in order to not interfere in the transfer of the pack to the diverter station or machine discharge area.

The flight drive units positioned opposing one another on each side of the main conveyor can be driven together by a mechanical drive take off from the main machine drive assembly. Otherwise, the flight drive units can be driven separately, in timed relationship, by separate drive assemblies using either conventional, such as mechanical drives from the main machine drive, or by separate servo motors that are timed with the movement of the main conveyor. Either way the flight drive assemblies are actuated, the drive which is utilized permits the timing of the push rods to the moving pack. Each type of flight drive assembly also is adjustable in order to allow for the flight assemblies and the push rods to be selectively positioned along the flight drive assemblies at various positions to contact the moving pack in the desired areas forwardly and rearwardly of the pack center, regardless of the size or dimensions of the pack. As referenced herein, the number of flight assemblies is determined by the pack dimensions and speed of the main conveyor, the number of filled packs per minute, such as in the example above. As with either a conventional drive, that is mechanical drive from the main machine, or with a servo drive, the drive for the flight drive assemblies can incorporate a common head shaft. However, if separate drives and head shafts for each flight carrying unit, better pack clearance and access to the carrying unit may be accomplished.

In another embodiment of the present invention, an additional turner rod or rods, such as two spaced, parallel turner rods on each flight assembly, both extending toward the conveyor centerline and the article pack, may be utilized on each flight assembly in order to pre-turn the article packs. This embodiment is useful, for example, to rotate packs that are square and so having sides or side walls of equal dimensions, such those wrapped around and carrying articles in a 2×2 or a 3×3 arrangement. In this embodiment, one of the two rods is moved forward of its companion rod on the flight assembly in order to contact the pack side wall before the adjacent rod on that flight assembly contacts the pack side wall. This effectively allows for pre-turning of the square pack by one of the pair of rods and the adjacent rod to complete the pack turn. These rods also can be controlled to move both toward and away from the main conveyor centerline (that is in the 'inward' direction and the 'outward' or transverse direction, respectively), to accomplish the pre-turning and proper positioning or squaring of the carton on its slat bed.

DETAILED DESCRIPTION OF THE PREFERRED EMBODIMENTS

Figure 2:
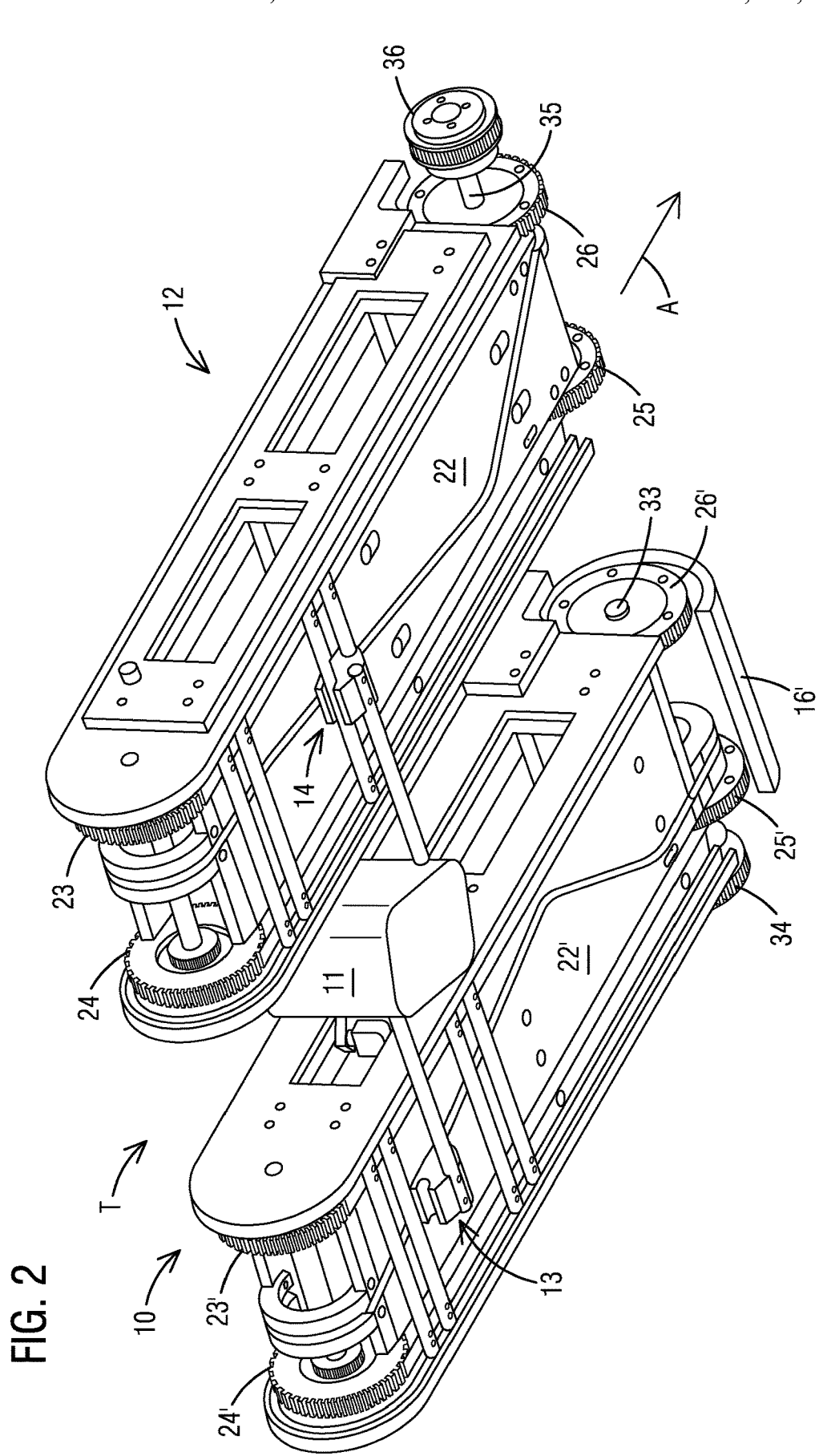
FIG. 2 is a perspective bottom view of the turning station of the present invention.

The present invention discloses a continuous motion packaging P machine having a carton or pack station turning T (FIG. 2). The present invention is described herein for use in packing machines designed to package articles in a wrap-type carton, such as the Marksman® brand packaging machine referenced herein. It is possible, however, for such a turning unit to be employed with other types of packaging machines, such as those adapted to place articles into a sleeve-type carton or a basket-type carton if desired. For the purposes of disclosing the present description, however, a packaging machine adapted to package articles in a wrap-type carton is discussed.

Figure 1:
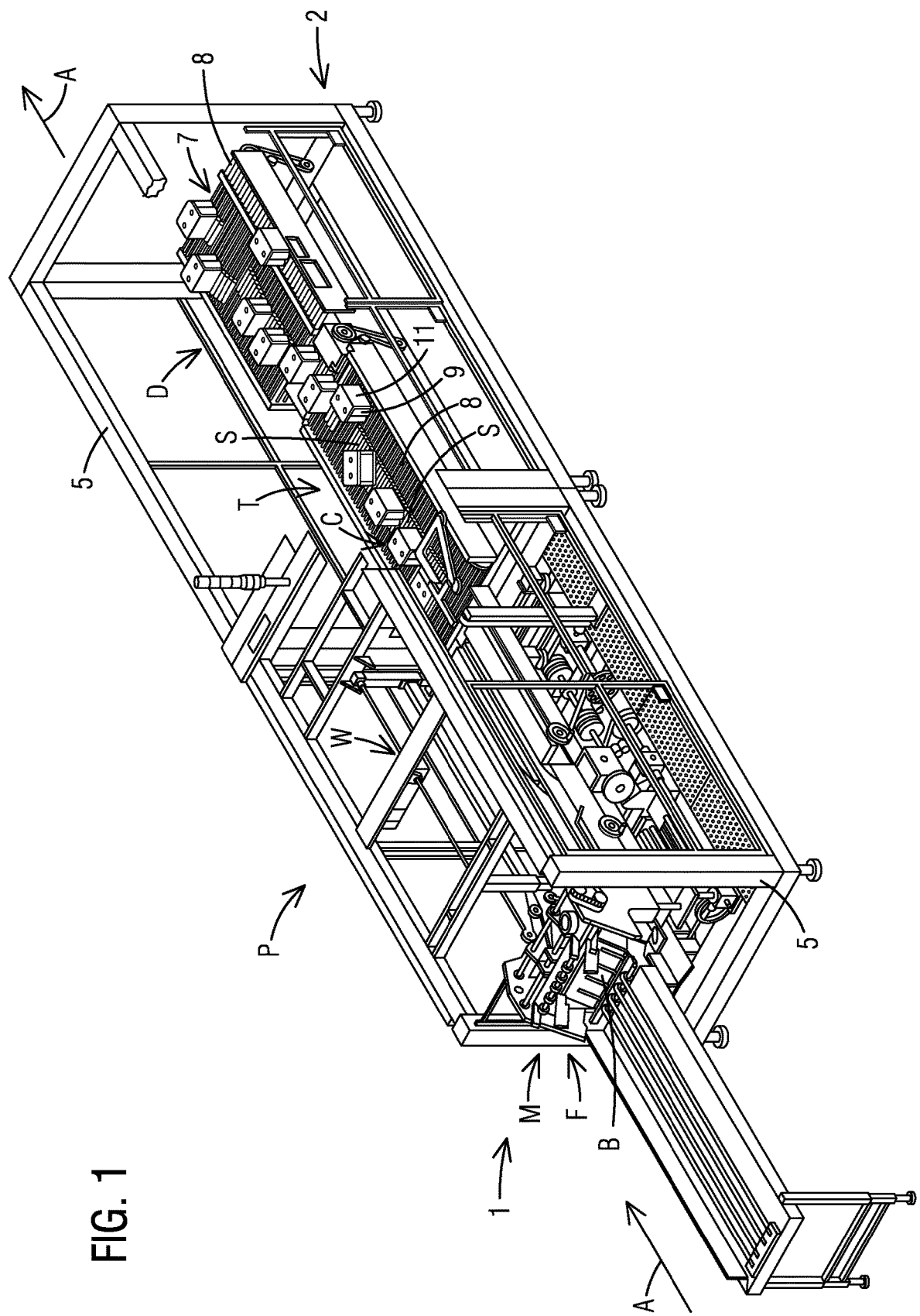
FIG. 1 is a perspective view of one embodiment of the packaging machine of the present invention showing the carton blank feeder, article wrapping station and the area where the pack turning station is positioned.

The packaging machine P includes any well-known article input station (not shown) where the articles 9 (FIG. 2) are delivered in mass and then grouped onto slats S supported by the main conveyor C into the desired article configuration. The article group typically is comprised of cans or bottles, that are glass or plastic, but can include any articles 9 that can be placed into a wrap-type carton, a sleeve-type carton or a basket-type carton. The cartons or packs 11 can be comprised of paperboard, but also can be of any suitable natural fiber or synthetic material. The various types of packaging machines, including those referenced herein, typically include a carton blank feeder F that is positioned at the upstream end 1 of packaging machine P, which also corresponds with the upstream end of a main conveyor. The main conveyor C runs essentially the length of the packaging machine from upstream end 1 adjacent to the carton feeder, to a downstream end 2 adjacent to an accumulation or delivery area (not shown). The pack 11 accumulation area receives the fully loaded or packed cartons. As shown in FIG. 1 and described in U.S. Pat. No. 7,503,447, there also can be an article diverter unit D downstream or adjacent to the machine end 2. Otherwise, the filled packs can be received upon a dead plate or other conveyor separate from the main conveyor C, downstream of end 2 without pack diverting, for movement away from the end 2 of the packaging machine P. Generally a number of the grouped packs are palletized. A carton blank wrap station (not shown) receives individual blanks B from feeder F and wraps the carton blank B over the article group, as is well known. As discussed herein, the "transverse direction" is normal to the longitudinal direction of conveyor C, which downstream, longitudinal direction of the main conveyor is indicated by arrow A. The longitudinal centerline of the conveyor C runs through the center point of the conveyor C, measured transversely, and is parallel to the side edges of the conveyor C. Conveyor C is a looped conveyor, and so the conveyor will be moved back upstream, under the top of the conveyor as shown in FIG. 1, after it delivers the packs 11 to the accumulation area. FIG. 1 also shows the slat bed, or slats S, attached to and carried by the main conveyor C in order to support the filled cartons or packs 11.

In a Marksman® brand wrap-type machine, the wrap station (not shown) receives the carton blank B and places or wraps the blank over the article group to secure the articles into the locked pack 11. This process is accomplished continuously and sequentially during operation of the packaging machine P. In these wrap-type packaging machines that package the articles 9, in, for example, a 2×3 arrangement having two shorter side edges (the "2 by" article sides) and a longer side edges (the "3 by" article side), the leading or downstream side of the packaged carton 11 as the carton moves in the downstream direction, arrow A, immediately away from the carton blank wrap unit W is that end of the carton surrounding two articles 9 of the group (the "2 by" article side). FIG. 1, illustrates packs 11 in a 2×3 article (cans) arrangement having opposing shorter sides that are partially open, opposing longer sides and a top wall or side as the carton leaves the wrap station and moves on conveyor C into the pack turning assembly T. The packs 11 also include a bottom wall or side (not shown) that in wrap-type cartons includes the carton locking arrangement. The leading side of pack 11 in this position, therefore, is the shorter side of the pack, as measured in the transverse direction to the longitudinal centerline of the main conveyor. The longer side of the carton or pack in this position containing this 2×3 arrangement therefore extends along the longitudinal direction, or direction of flow of the main conveyor along arrow A as the carton leaves the carton wrap station. It is desirable, however, in some instances then to rotate the loaded carton approximately 90 degrees so that the longer side (the "3 by" article side in a 2×3 article configuration) leads in the direction of arrow A after wrapping station W and prior to its delivery to the diverter unit or to a pack accumulation area (not shown). This second orientation, following pack 11 rotation, can facilitate pack 11 handling as the packs are gathered for palletizing.

The present invention includes a pack turning assembly or station T positioned along the conveyor C between the carton wrap station (not shown) and the pack diverter area 7 or the article accumulation area (not shown) that is downstream of the pack diverter area 7 (FIG. 1). The pack turning assembly T includes opposed flight drive assemblies 10 and 12 (FIG. 2) spaced along the main conveyor C, with flight drive assembly 10 on the left side of the main conveyor C and flight drive assembly 12 on the right side of the main conveyor C, as viewed in the downstream direction. The flight drive assemblies 10 and 12 are positioned opposite one another on each side of the main conveyor C, such as the rod conveyor disclosed in U.S. Pat. No. 7,553,407 referenced herein. These flight drive assemblies 10 and 12, however, can be located in any available position of packaging machine P after wrapping station W and before the diverter station or the pack accumulation area.

Figure 11:
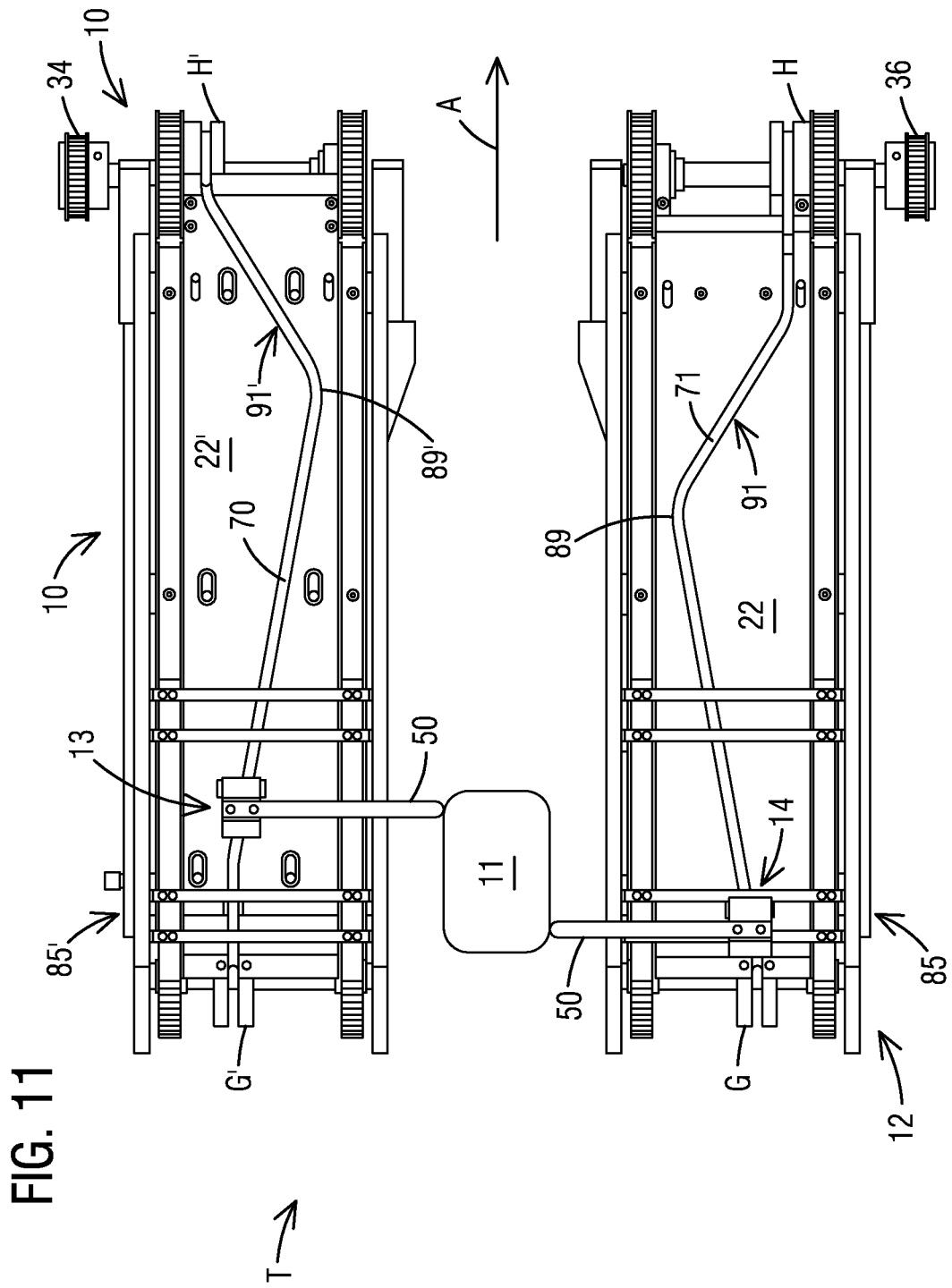
FIGS. 11-17 are bottom plan views of the flight drive assemblies of the present invention with associated flight assemblies progressively moved downstream in the sequential views.

Continuous motion packaging machines typically include a frame 5 that supports the main conveyor C (FIG. 11). The frame 5 can support components of the packaging machine both from below the machine conveyor C and from above the conveyor C as shown in FIG. 1. The main conveyor C either is driven from a gear or pulley take-off of the main machine drive, or by separate servo motors, as is well known. As discussed herein, the flight drive assemblies 10, 12 are timed with the movement of the main conveyor C. The flight assemblies 13, 14 (FIG. 2) are themselves adjustable along the length of the flight drive assemblies 10,12. The conveyor C in one example of the present invention is the same type of rod conveyor pulled or carried by chains connected to each end of the transversely extending, parallel rods, as disclosed in U.S. Pat. No. 7,553,407. The conveyor C carries a series of slats S between each transverse conveyor rod 8, which slats S are designed to support and carry respective packs of articles above rods 8 toward the discharge or downstream end 2 of the conveyor C and toward a collection tray or an article diverter unit. Since the slats are attached to the conveyor C between the parallel conveyor rods 8, the slats S can move with conveyor C around the head drive shaft (not shown) and the tail drive shaft (not shown). The conveyor C, therefore, is driven from the machine upstream end 1 and toward the machine downstream end 2, to convey both articles 9 and packs 11 along a downstream longitudinal path of travel in the direction of arrow A toward the downstream end 2. Various other units or stations can be supported by frame 5 on one or both sides of the main conveyor to accomplish tasks, including grouping articles, effecting placement of articles into a carton, and tucking or folding various parts of the carton.

At the upstream end 1 of the conveyor, the carton blank feeder F picks carton blanks B, one at a time, from a carton supply magazine M. Also positioned at or near the upstream end 1 of the machine is an article grouping station (not shown) that places articles 9 in a desired grouping configuration onto the main conveyor. Such article grouping stations are well known. The article group is conveyed to a wrap station (not shown) downstream from the article grouping station. This carton wrap station receives a carton blank B from the carton blank feeder F, places the carton blank over and around the article group, and locks the wrap-type carton blank B around the article group to form an enclosed carton or pack 11 filled with articles 9. Often such filled packs 11 have one or both of the shorter end sections at least partially open, with some flaps tucked downwardly or inwardly into the pack 11 to stabilize the article group within the pack.

The filled packs 11 of articles 9 then are moved on the conveyor slats S further downstream toward a discharge end 2 of the machine. In the case of a wrap-type pack 11 with the articles in a 2×3 configuration or any configuration having longer side edges and shorter side or end edges, at this position before the packs are turned, a shorter side edge of the carton (FIG. 1) is the leading or downstream side in the direction of the main conveyor direction of movement, arrow A. These packs 11 then consecutively and continuously pass through pack turning station T.

The turning assembly or station T of the present invention, however, differs from the turning assembly disclosed in U.S. Pat. No. 7,553,407, in that the packaging machine P of the present invention includes a different method and apparatus for turning the packs 11. The turning method and apparatus disclosed in U.S. Pat. No. 7,533,407 is not utilized in packaging machine P of the present invention. Fight drive assemblies 10 and 12 function cooperatively to turn the filled pack 11 as the packs are moved continuously toward the downstream end 2 by conveyor C. The packs 11 of FIGS. 1-18 are 2×3 packs with longer and shorter sides. Each of these assemblies, 10 and 12, have identical elements, except for the exact shape of their respective cam tracks, as shown and discussed herein. FIG. 2 shows the bottom view of flight drive assemblies 10 and 12, and includes the downstream directional arrow A, the downstream moving direction of conveyor C. Flight drive assembly 10 (on the left side of conveyor C, as shown in FIG. 2) includes several flight assemblies 13 spaced from one another (FIG. 10), although for illustration in FIG. 2, only one complete flight assembly 13 is shown. Flight drive assembly 12 (on the right side of conveyor C, as shown in FIG. 2) also includes several flight assemblies 14 spaced from one another, although for illustration, also only one complete flight assembly 14 is shown in FIG. 2. The flight assemblies 13 and 14 include linear bearings, rods and shafts commercially available from PBC Linear of Rockford, Ill.

Figure 3:
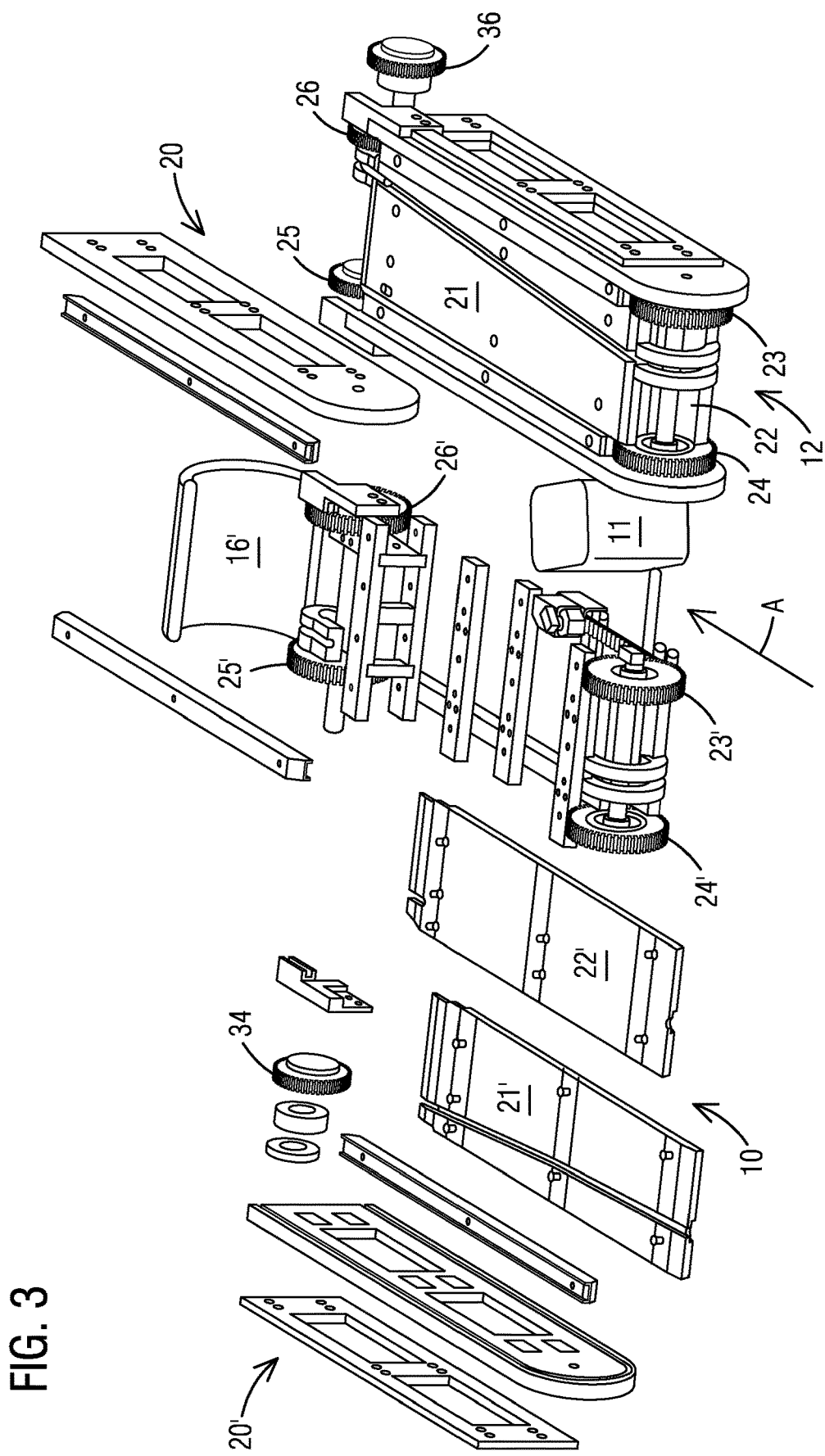
FIG. 3 is an exploded top view of the turning station of the present invention.
Figure 4:
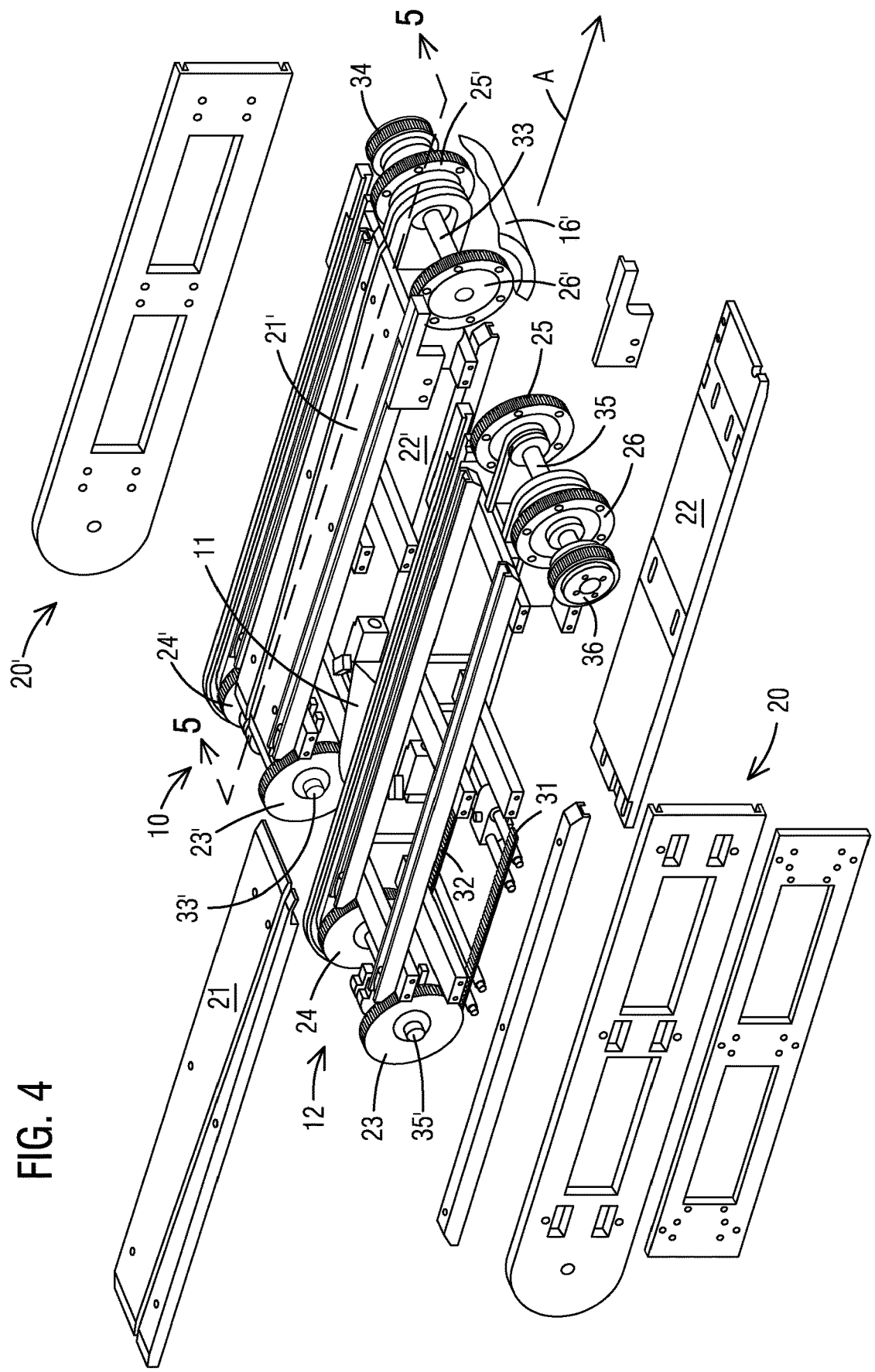
FIG. 4 is an exploded view of the turning station of the present invention.
Figure 5:
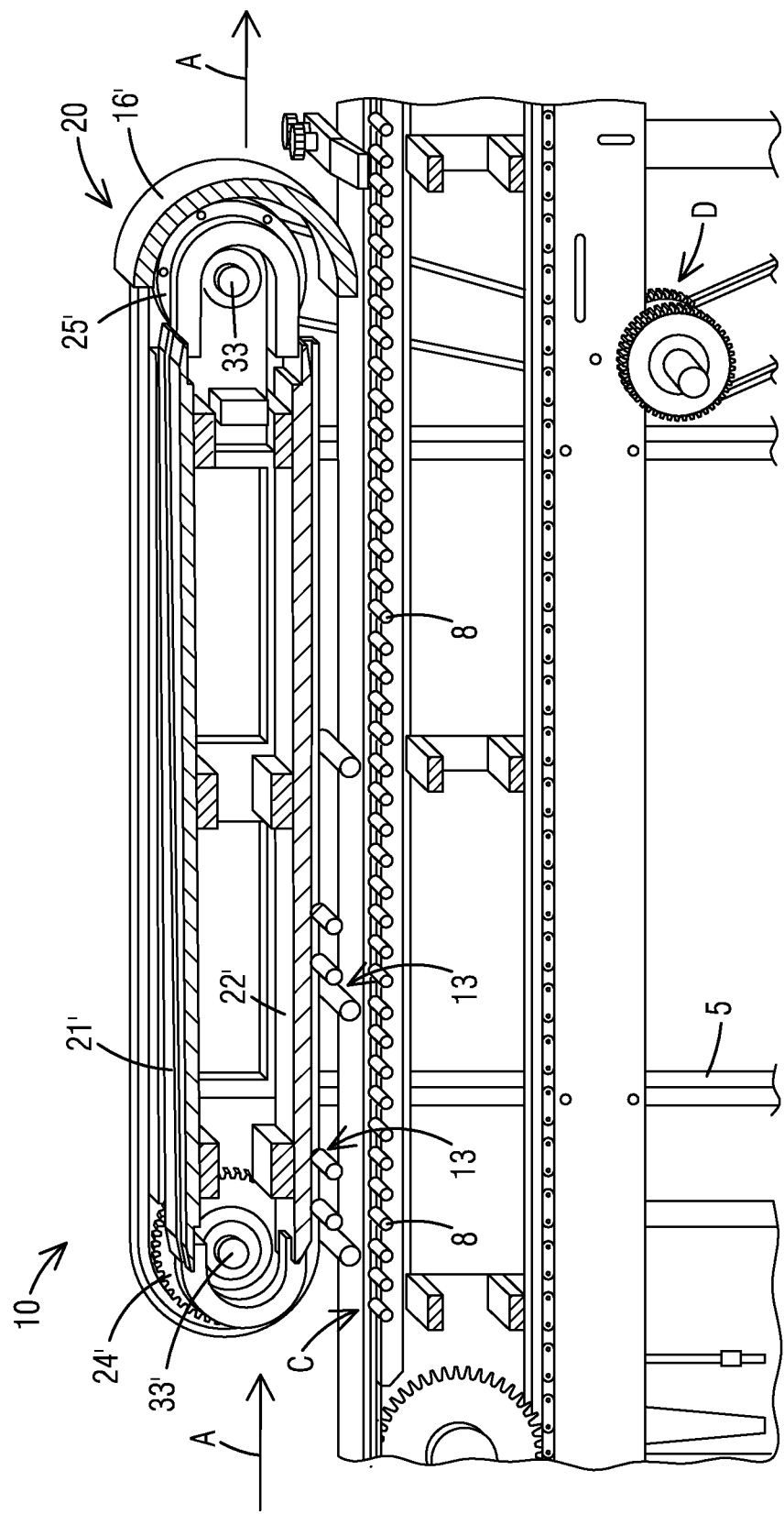
FIG. 5 is a cross-sectional view of the flight drive assembly of FIG. 5, taken along lines 6-6.

FIGS. 3 and 4 show flight drive assemblies 10 and 12 in exploded or partially exploded views. Each flight drive assembly supports upper and lower beds that define cam tracks therein, head and tail gears that pull belts to move the flight assemblies and to which each flight assembly is attached, and the necessary frame elements to support these components. As discussed herein, these principal components drive the flight assemblies that include turner rods, from a starting position and then progressively moved in the downstream direction, beneath and across a lower plate that includes a first cam track. This cam track of the lower plate causes the turner rods to be moved toward and away from the pack 11 and longitudinal centerline of conveyor C. The flight assemblies then are further driven around a head or drive gear and thereafter in the upstream direction, across an upper plate that also includes a differently shaped, second cam track that further actuates and retracts the rods until the flight assemblies are moved around a tail drive gear and to their initial starting position. The cam tracks defined by each plate of flight drive assemblies 10 and 12 are further discussed herein. The positioning and use of several, spaced flight assemblies 13 and 14 that are driven by each flight drive assembly accomplishes the sequential turning or rotation of consecutive packs 11 moving through turning assembly T. This sequential turning of continuously fed packs is due to the actuation of the cooperating and opposing turner rods. This turning is accomplished continuously from turning the first contact if the turner rods until the pack is fully rotated, approximately 90 degrees, with certain phases illustrated in FIGS. 11-17 on consecutive packs 11, and is timed with the movement of the packs 11 downstream on conveyor C.

In FIG. 3, flight drive assembly 10 (shown in a top, exploded view) includes frame assembly 20' that supports upper plate 21', lower plate 22' and pulleys or gears 23', 24', 25' and 26'. Similarly, flight drive assembly 12 includes frame assembly 20 that supports upper plate 21 lower plate 22 and gears or pulleys 23, 24, 25 and 26. While the components of frame assemblies 20 and 20' of the present invention are shown in FIG. 3, those skilled in the art understand that the frame assemblies 20 and 20' could include other elements, as long as the respective upper and lower plates and the gears of each flight drive assembly are appropriately supported. FIG. 4 illustrates another exploded view of flight drive assemblies 10 and 12. In FIG. 4, flight belts 31 and 32 also are shown on flight drive assembly 12. Flight belt 31 loops around pulleys or gears 23 and 26, while flight belt 32 loops around gears 24 and 25. The flight drive assemblies 10 also include a flight belt (not shown) looped around gears 23' and 26', and another flight belt (not shown) looped around gears 24' and 25' just as with flight drive assembly 12. The gears 25' and 26' are connected by a head or drive shaft 33, and gears 23' and 24' are connected by a tail shaft 33'. Pulleys or gears 23 and 24 are supported by tail shaft 35'. Curved sweeps, such as sweeps 16 and 16', preferably are mounted to each frame assembly adjacent to and spaced from pulleys or gears 25, 26, 25' and 26' to protect the flight assemblies 13 and 14 as they are driven around these pulleys. Head shaft 33 also carries an adjusting pulley or gear 34, so that shaft 33 can be rotated using gear 34 when the flight drive assembly 10 is in a stopped mode, in order to adjust the belts (not shown) around the gears of assembly 10 either in the upstream or the downstream directions, as desired, and thereby adjust the starting and pack 11 engaging positions of the flight assemblies carried by those belts, as discussed herein. The use of such adjusting gears to position a shaft and accompanying drive gears is well known.

Figure 6:
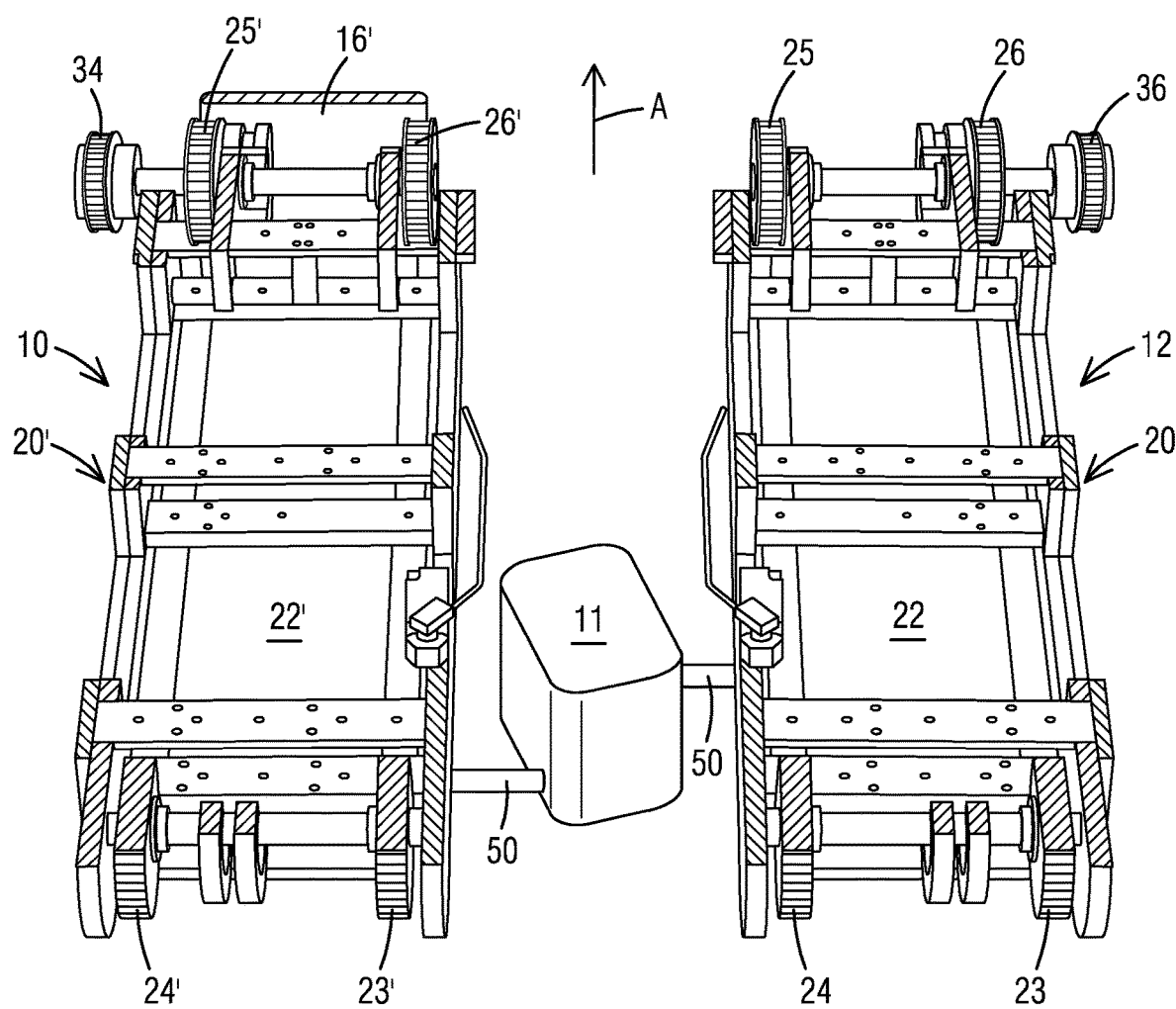
FIG. 6 is a top perspective view of the turning assembly of the present invention with the top plates of each flight drive assembly removed from view.

Similarly, gears 25 and 26 of flight drive assembly 12 are connected by head or drive shaft 35. An adjusting pulley or gear 36 is carried by head shaft 35 so that the shaft 35 can be rotated using gear 36 when the flight drive assembly 12 is in a stopped mode. Shaft 35 and gears 25 and 26 thereby can be rotated, adjusting the longitudinal positions of belts 31 and 32 around the gears of assembly 12. This adjustment of the belts 31 and 32 will change the starting and engaging positions of each of the flight assemblies 14 carried by those belts, identically as discussed with the belts of flight drive assembly 10. The flight drive assemblies also can be driven either by servo motors connected to drive shafts 33 and 35, respectively, or by a mechanical drive take off D (FIG. 5) from the main machine drive (not shown) so that the flight drive assemblies 10 and 12 are moved in timed relationship with conveyor C. In FIG. 6, shown with top plates 21, 21' removed and not shown, which is taken along cross-section 7-7 of FIG. 18, frame assemblies 20, 20' that are utilized to support the cam plates are depicted. As discussed herein, however, any suitable frame for the flight drive assemblies that will support the elements of those flight drive assemblies, including the cam plates, pulleys and flight assemblies.

Figure 7:
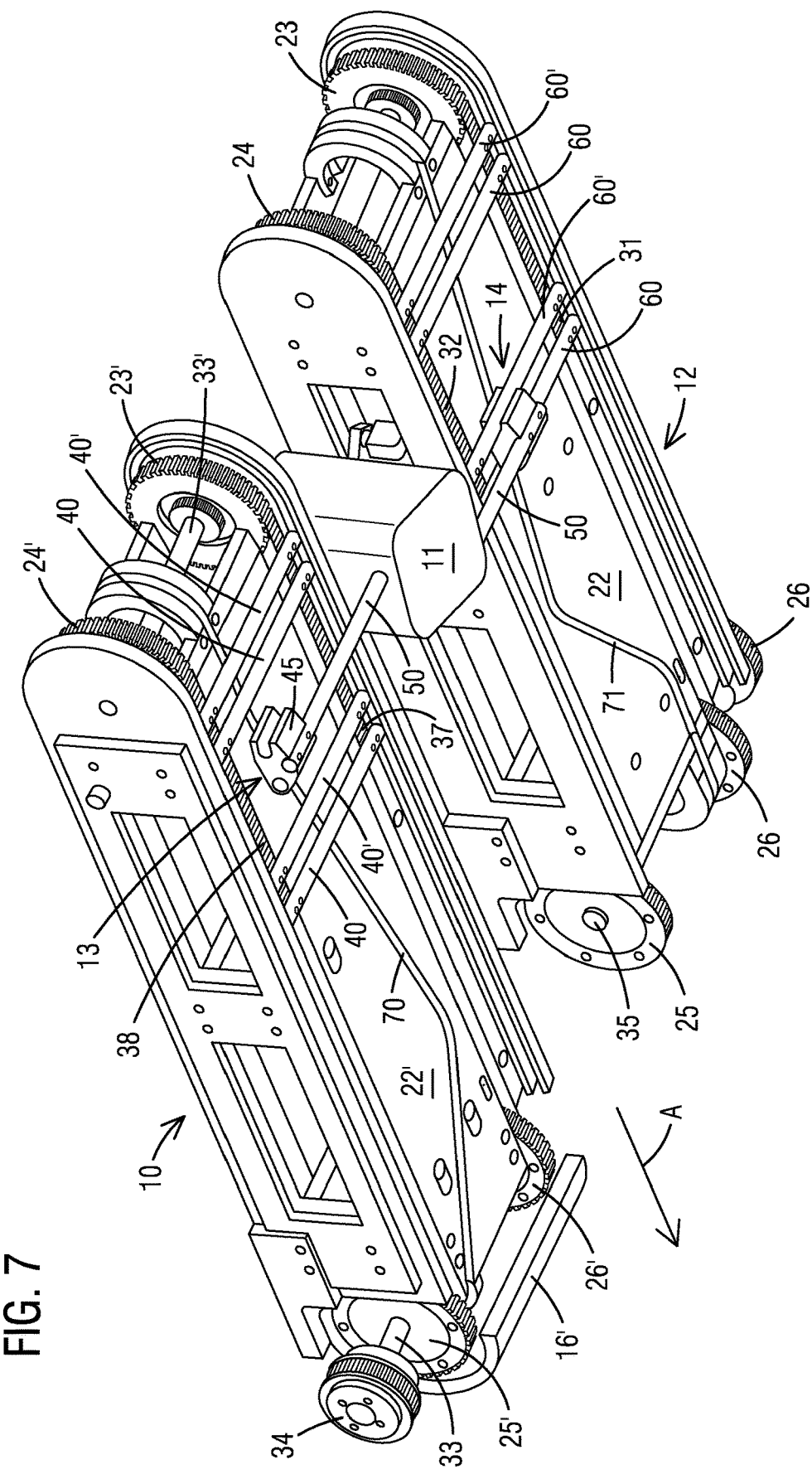
FIG. 7 is a bottom perspective view of the flight drive assemblies of the present invention.

As shown in FIG. 7, flight assembly 13 of flight drive assembly 10 is connected to belt 37 at one end and belt 38 an its opposite end, so that assembly 13 is moved or driven by belts 37 and 38, with belt 37 being driven around pulleys or gears 23' and 26', and belt 38 being driven around pulleys or gears 24' and 25'. Belts 37 and 38 are driven together by drive shaft 33. Also, flight assembly 14 is connected to belt 31 at one end and belt 32 an its opposite end, so that assembly 14 is moved or driven by belts 31 and 32, with belt 31 being driven around gears 23 and 26, and belt 32 being driven around gears 24 and 25. Belts 31 and 32 are driven together by drive shaft 35. As FIG. 7 shows the drive assemblies 10,12 from a bottom view, the flight assemblies 13,14 are driven in the direction of arrow A, the main conveyor direction as it moves the packs in the downstream direction. Flight assembly 13 and flight assembly 14 include identical elements and features. Assembly 13 includes flight shafts 40 and 40' (FIGS. 7,8) which are mounted by pins or other similar elements to belts 37 and 38 near to their opposite ends 42, 43, and 44 and 49.

Figure 8:
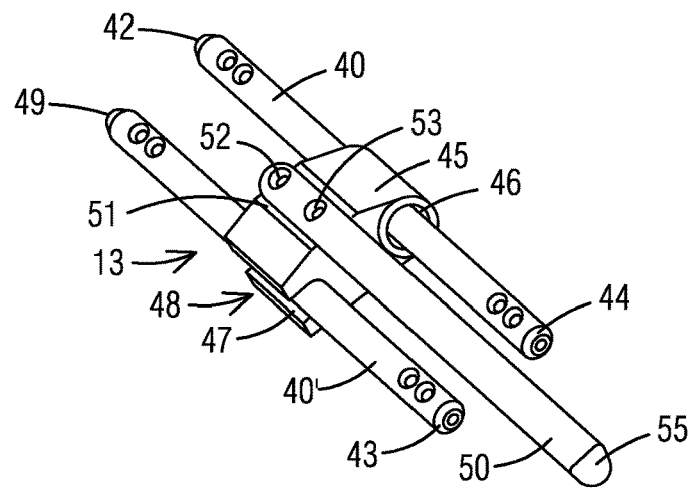
FIG. 8 is a perspective view of a flight assembly of the present invention.

The flight shafts 40 and 40' pass thorough a block, such as bearing block 45 that contains the liner bearings referenced above, so that block 45 can slide along the flight shafts both toward and away from the conveyor C longitudinal centerline and toward and away from flight drive assembly 12. FIG. 7 shows an exploded view of a flight assembly 13 with the block 45 separated from rods 40 and 40' for illustration. Block 45 generally is triangular-shaped and defines an enclosed channel 46 along its length on one side (FIG. 8). Flight shaft 40 is received within channel 46. The side of block 45 that defines channel 46 is the downstream side of the block 45 as the block 45 moves across and beneath plate 22' in the downstream direction, arrow A. Block 45 also defines a second, but open channel 47 at the opposite side from channel 46, as shown in FIG. 8. Flight shaft 41' is received within channel 47. Channel 47 therefore is "C-shaped" with an open side 48 facing in the upstream side of the block 45 as the block 45 moves beneath and across plate 22' in the downstream direction, arrow A. Flight assembly 13 also includes a turner rod 50 that mounted by pins or other suitable elements to linear block 45 along its top side 51 through holes 52 and 53. Turner rod 50 defines a free or distal end 55 extending toward flight drive assembly 12, which end 55 preferably is not flat, but a tapered shape such as being rounded, to facilitate the type of contact with and turning of a pack 11, as discussed herein. The turner rods could be any cylindrical shape with a hemispherical end out of any material or a rectangular shape with a distal end having a curve or radius. The distal end 55 of the rod can have a plastic tip to facilitate smooth contact and movement against a pack 11 side. As the block 45 slides on flight shafts 40 and 40' as described herein, the turner rod 50, being attached to block 45, also moves both toward and away from the conveyor C centerline and toward and away from flight drive assembly 12. A cam follower 56 (FIG. 9) extends upwardly from liner block 45 and is received within a cam track 70 of bottom or lower plate 22' in this view.

Figure 9A:
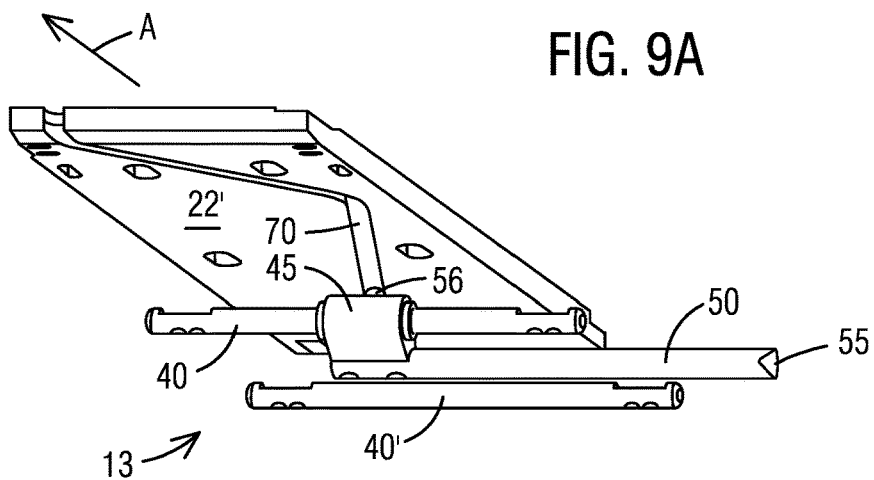
FIG. 9A is a perspective view of a flight assembly of the present invention positioned with a cam follower within a cam track of a lower cam plate.
Figure 9B:
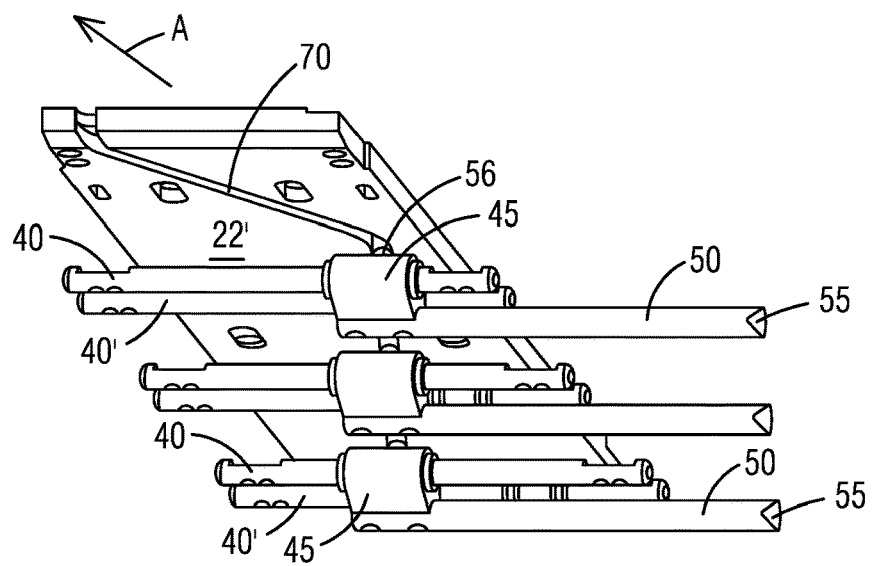
FIG. 9B is a perspective view of spaced flight assemblies of the present invention each positioned with a cam follower within a cam track of a lower cam plate.
Figure 10:
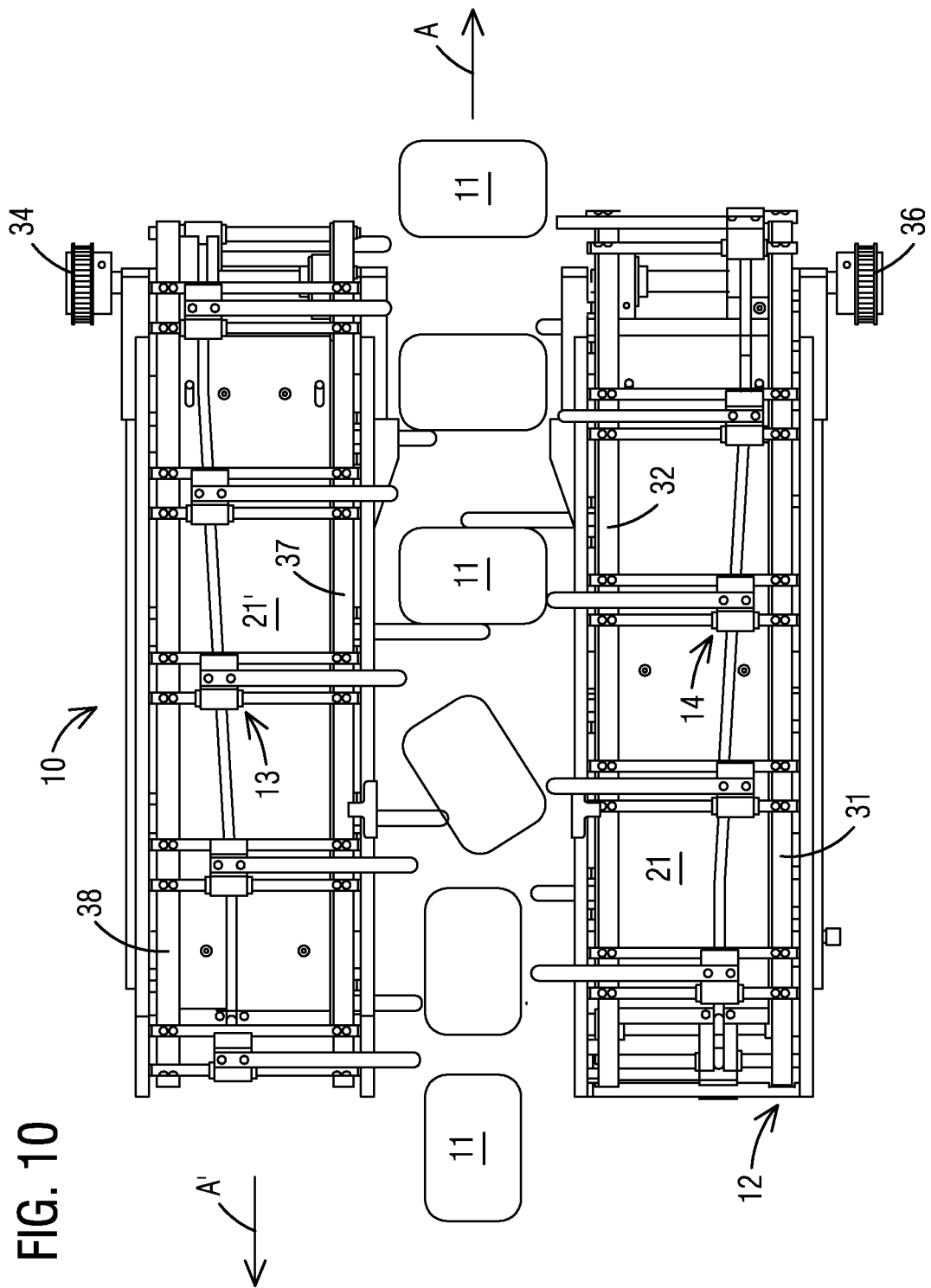
FIG. 10 is a top plan view of the article turner station and the flight drive assemblies of the present invention.

Flight assembly 14 includes flight shafts 60 and 60' that are identical to flight shafts 40 and 40' (FIG. 7) that are mounted by pins or other similar elements to belts 31 and 32 near to their opposite ends identically to the mounting of flight shafts 40 and 40' to belts 37 and 38. Flight assembly 14 also includes a block 45. Channel 46 defined by linear block 45 of assembly 14 receives flight shaft 60 while channel 47 having open or "C-shaped" side 48 receives flight shaft 60'. Assembly 14 also includes a turner rod 50 mounted to block 45, identically to the mounting of turner rod 50 of flight assembly 13. As with flight assembly 13, the side of block 45 that defines channel 46 of assembly 14 is the downstream side of the block 45 as the block 45 moves beneath and across plate 22 in the downstream direction, arrow A. The open and opposite side 48 of block 45 of assembly 14 therefore faces in the upstream side of the block 45 as the block 45 moves beneath and across plate 22 in the downstream direction, arrow A. The free or distal end 55 of turner rod 50 of assembly 14 extends toward flight drive assembly 10. The end of turner rod 50 as shown in FIG. 9, however, is not rounded but is tapered on opposite sides at end 55, which tapered end also facilitates the turning of a pack 11. As the linear block 45 slides on flight shafts 40 and 40' (or 60 and 60' in assembly 14) as described herein, the turner rod 50, being attached to block 45 of flight assembly 14, also moves both toward and away from the conveyor C centerline and toward and away from flight drive assembly 10. As flight assembly 14 passes beneath and across lower plate 22, assembly 14 also includes a cam follower 56 extending upwardly from its block 45 and is received within a cam track 71 of bottom or lower plate 22. FIG. 10 shows cam follower 56 of flight assembly 13 being driven in the direction of arrow A within cam track 70.

As stated above, the drive pulleys or gears 25, 26, 25' and 26' of the flight drive assemblies 10 and 12 can be driven by servo motors (not shown). For example, there can be ten flight assemblies 13, 14 equally spaced apart associated with each flight drive assembly, 10,12 and moved in timed relation to the conveyor C speed so that an assembly 13 and 14 are positioned to contact and turn each consecutive pack 11 as it moves through turner assembly T. More or less flight assemblies 13, 14 can be utilized, depending upon the conveyor C speed and spacing of packs 11 along the conveyor.

Figure 18:
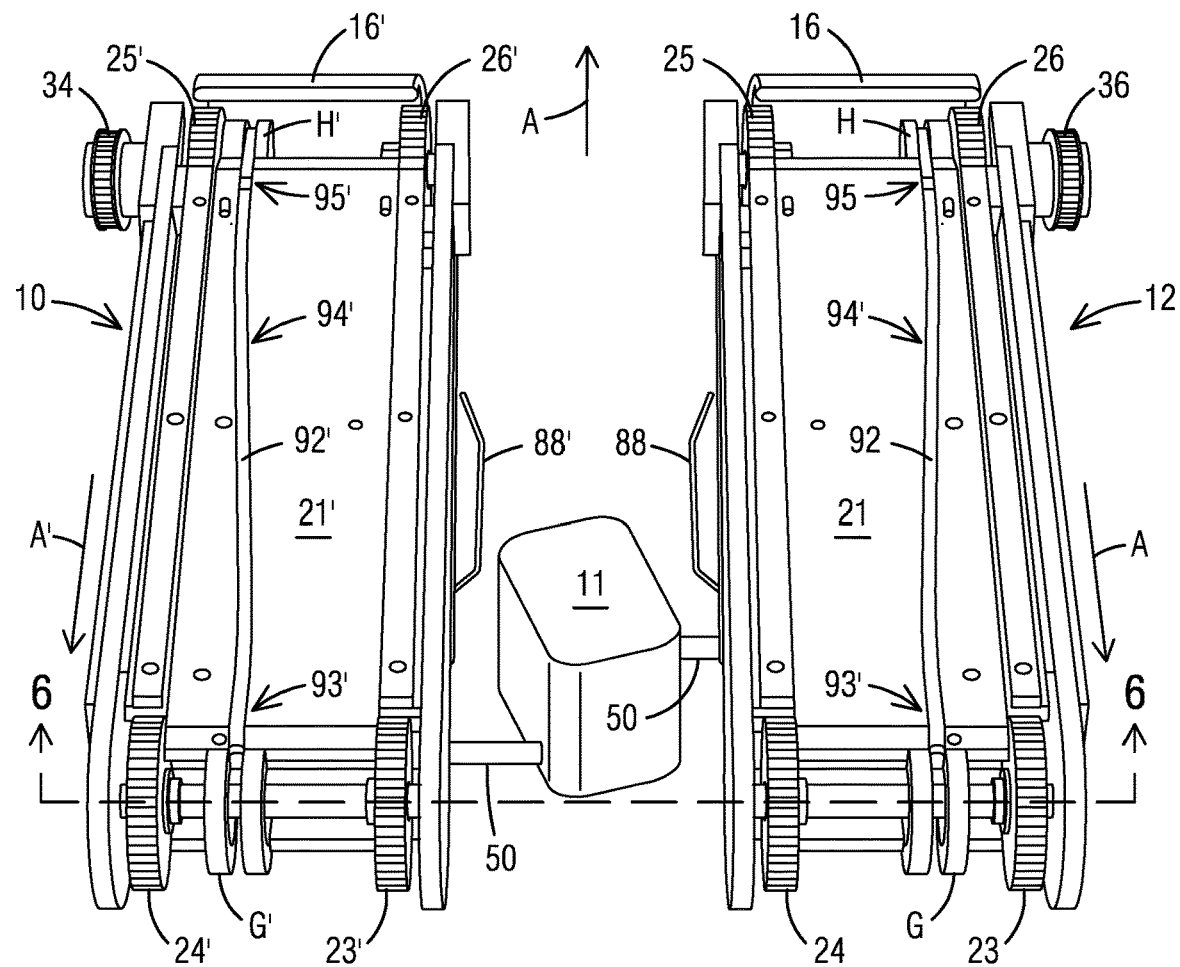
FIG. 18 is a top perspective view of the flight drive assemblies of the present invention.

FIG. 10 shows a plan view of a turner assembly T with packs 11 consecutively moving along conveyor C in the downstream direction of arrow A between flight drive assemblies 10 and 12, respectively. When viewed from above (FIG. 10) the drive belts 31, 32, 37, and 38 are driven in the upstream direction of arrow A', opposite the direction of arrow A when pulled across upper plates 21 and 21'. The turner rods 50 of the flight assemblies 13 and 14 move progressively toward the conveyor C centerline as they are driven back upstream in the direction of arrow A', opposite arrow A. (FIG. 18 shows the profiles of cam tracks 92 and 92'). As the flight assemblies 13,14 move around their respective head or drive gears and are positioned just over the downstream end of upper or top plates 21,21', the ends 55 of the turner rods 50 are positioned the furthest from the conveyor C centerline. In this position, turner rods 50 and are positioned or retracted away from successive packs as the flight assemblies are driven to the initial starting position. As also shown in FIG. 10, the pack 11 enters the turner assembly T with its shorter side, or "2 by" side, in the downstream direction along conveyor C.

As discussed further herein and shown in FIGS. 11-17, the flight shafts 50 of each flight assembly 13,14 on opposed flight drive assemblies 10, 12 are actuated as they are driven beneath and across lower plates 22, 22' to extend towards pack 11 to contact pack 11 and assist in turning the pack. As the pack 11 moves further downstream through turner assembly 11, each flight assembly 13, 14 is driven around their respective tail gears 23, 23', 24 and 24' as described herein, and actuated by the engagement of cam followers 56 in respective cam tracks 92, 92' defined in plates 21 and 21', respectively to move back away from the contacted pack 11 and be driven by its flight drive assembly back to a starting position, where the process is repeated. As the packs 11 exit the turner assembly, the longer or "3 by" side of the 2×3 configured pack 11 now is positioned in the downstream direction indicated by arrow A.

FIG. 10 also shows adjacent flight assemblies 13, 14 spaced along belts 31, 32, 37 and 38. The flight shafts 50 of adjacent flight assemblies are adjustable relative to each other, and so can be adjusted to have two product diameters (for example, can diameters) between them by adjusting one or other of the drive pulleys by adjusting gears 34 and 36, respectively. In the case of standard U.S. sized, 12 ounce beverage cans, the width dimension of a standard U.S. 12 oz. beverage can approximately 2.60 inches. The servos or mechanical take-offs driving the drive pulleys or gears then is timed to the parent machine conveyor C so the midpoint of the width between the pair of adjacent turner rods 50 is at the center point of the pack 11 along its upper side and center point of the machine pitch, which pitch is equal to the distance in the longitudinal direction, between center points of adjacent packs 11 passing through turner assembly T FIGS. 11-17 show a plan view of turner assembly T, with the orientation of pack 11 progressively changing by rotation of packs 11 on slats S from the upstream end to the downstream end of assembly T by contact with turner rods 50 on flight assemblies 13, 14. Therefore it is understood that packs 11 are contacted and turned as the flight assemblies are moved under and across plates 22 and 22'. It is noted that in FIGS. 11-17, many of the adjacent flight assemblies 13 and 14 associated with opposing and cooperating flight drive assemblies 10, 12 have been removed for illustration purposes, the arrangement of adjacent flight assemblies 13, 14 being shown in FIG. 11. FIGS. 11-17, also show the blocks 45 and flight shafts 50 in various transverse positions as they are moved progressively downstream. The turner rods 50 are separated from their associated support or flight shafts 40 and 40', for illustration. It is understood that each flight shaft pair 40, 40' associated with a block 45 also remains attached to block 45 and moves along with and supports block 45 as it moves downstream, as shown in FIG. 11.

Figure 12:
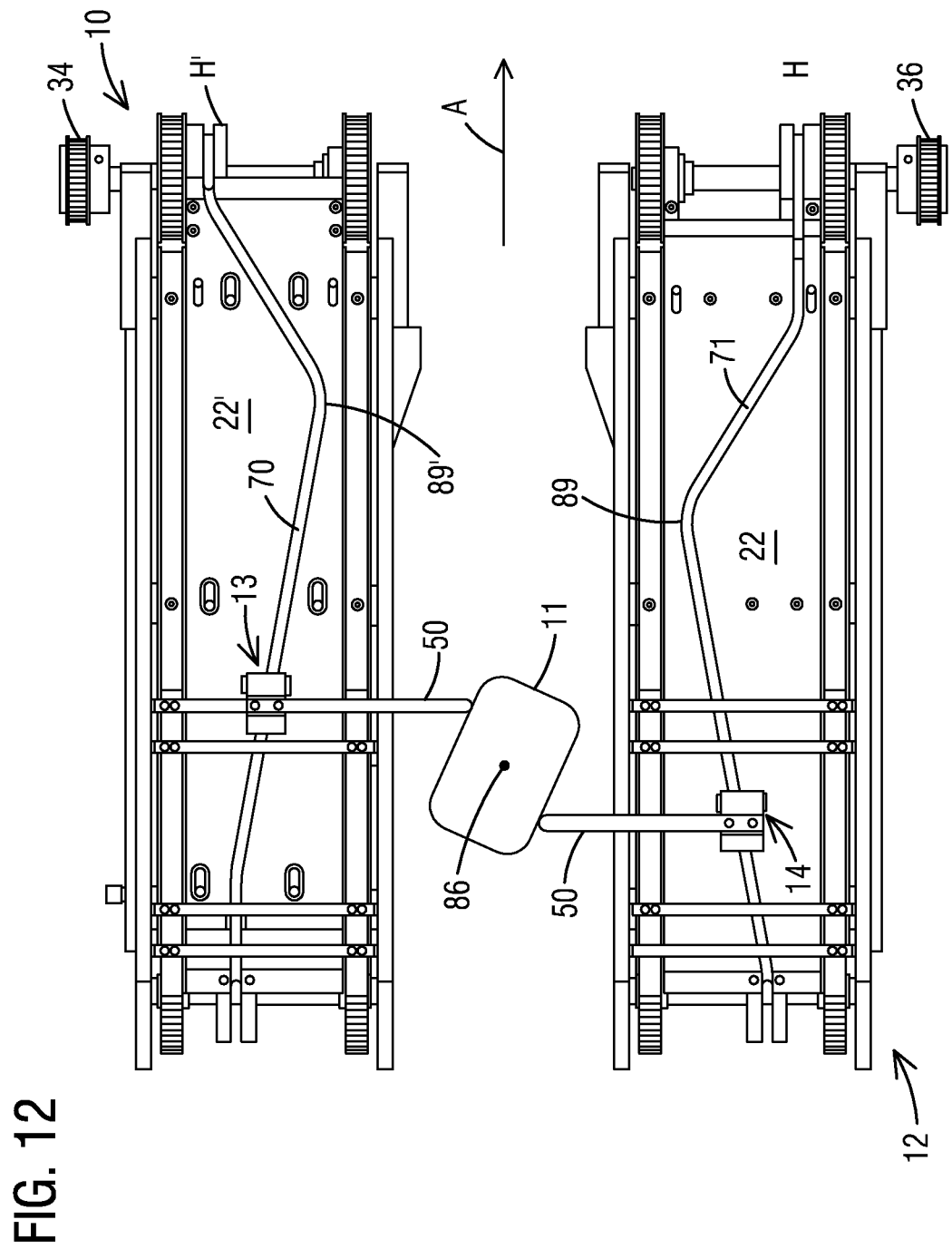
Figure 13:
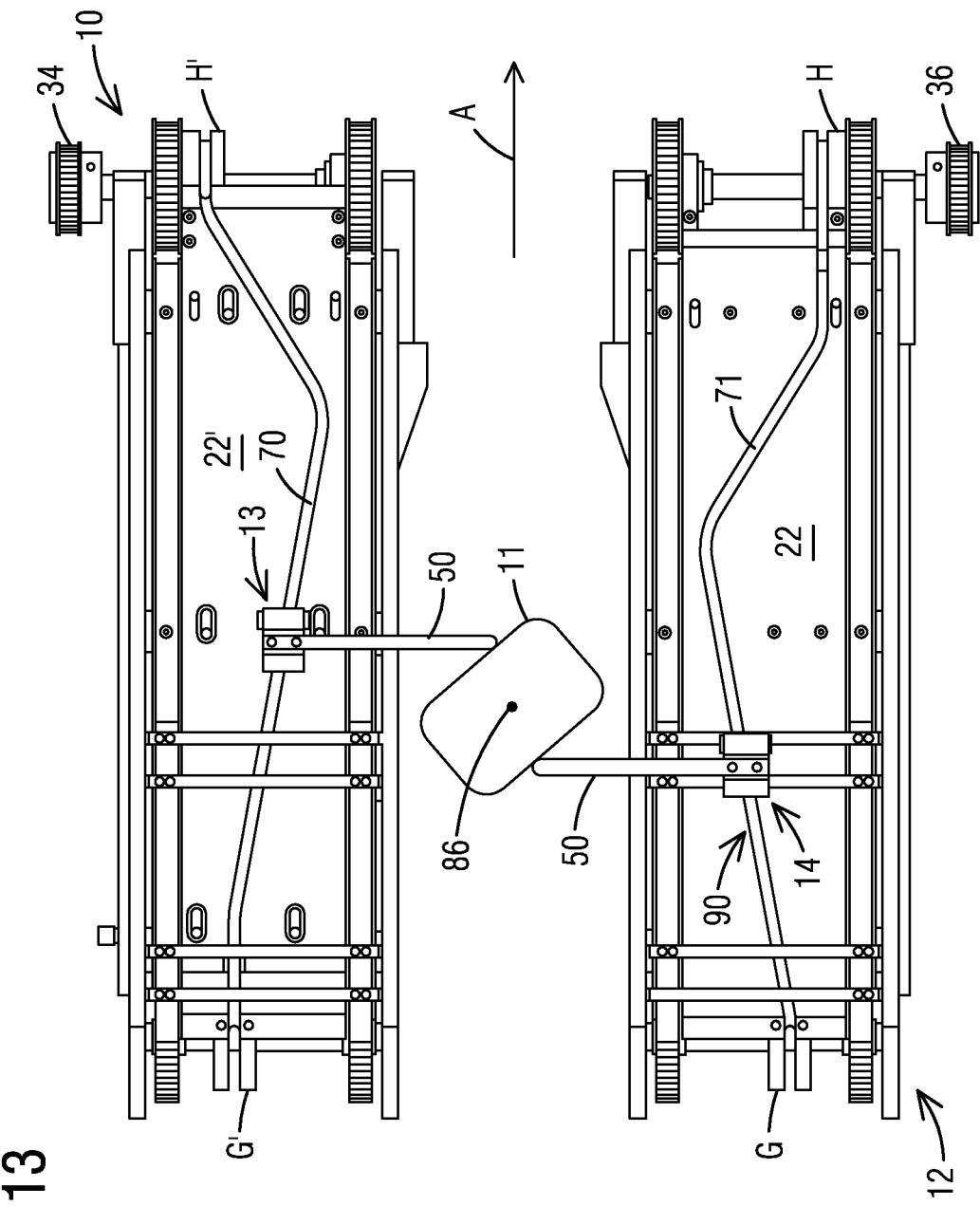
Figure 14:
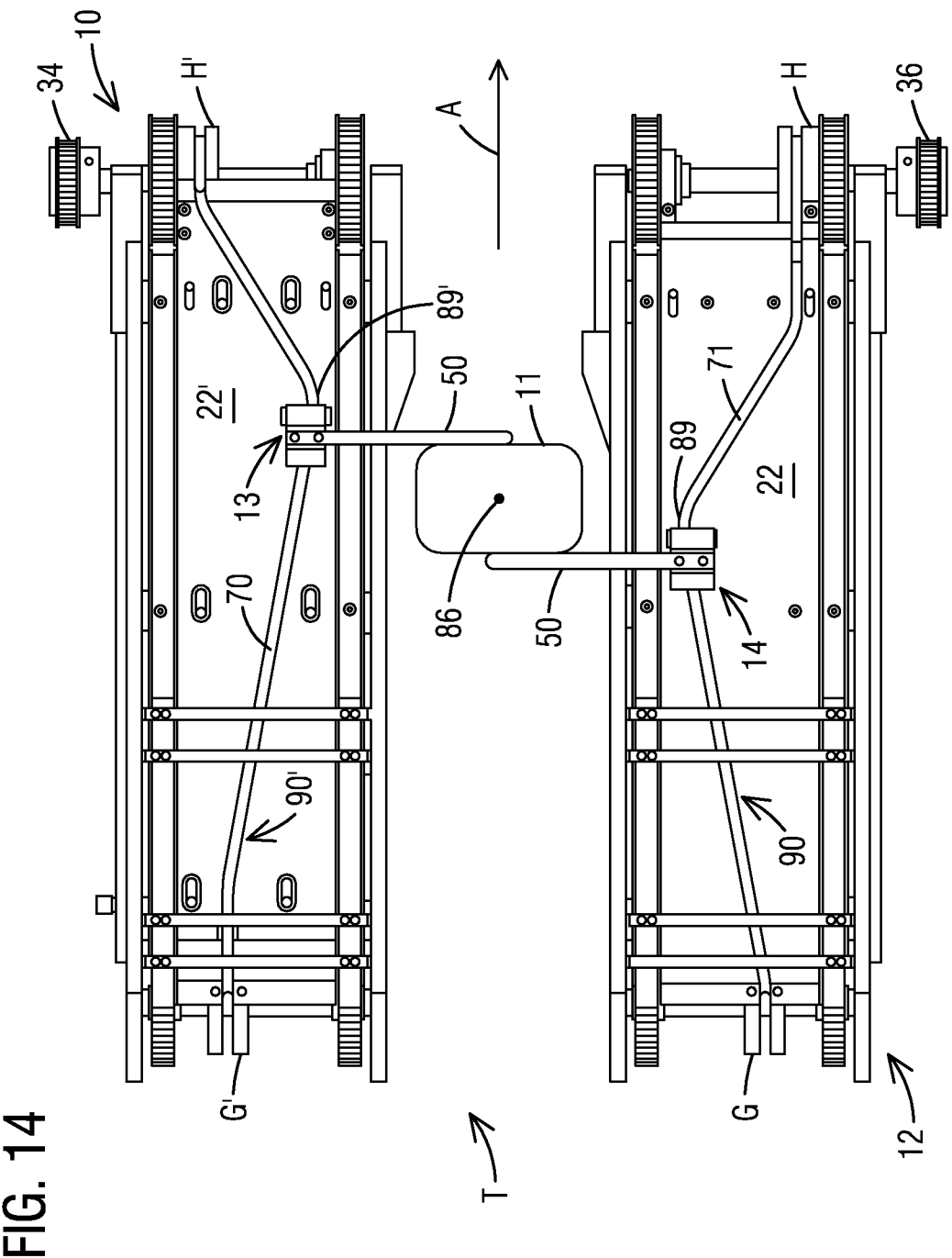
Figure 15:
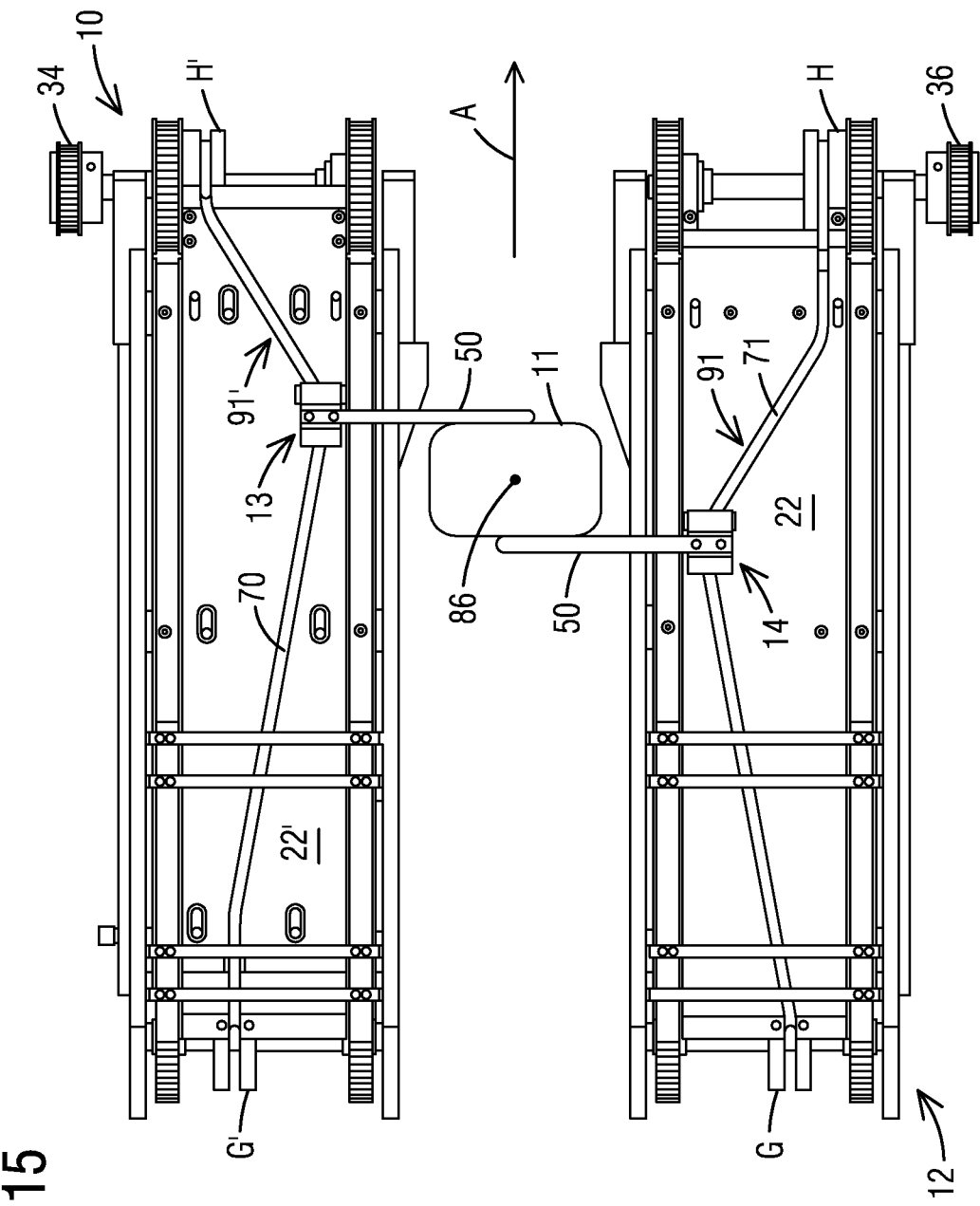

In FIG. 11, viewing the flight drive assemblies 13, 14 from below, flight assembly 14 is in an approximate starting position 85, which is towards the upstream end of flight drive assembly 12. Any position along each flight drive assembly 10, 12 of flight assemblies 13, 14, however, could be considered a starting position, since the flight assemblies move in a closed loop path of travel. Similarly, flight assembly 13 of flight drive assembly 10 is in its starting position 85'. As discussed herein, the starting positions of flight assemblies 13,14 are adjusted using adjusting gears or pulleys 34, 36 so that the opposing flight shafts 50 of assemblies 13, 14 will contact a pack 11 laterally from the pack 11 center point 86 (FIG. 12). Also, the movement of the blocks 45 and associated cam follower 56 along the respective cam tracks 70, 71 causes the blocks 45 and flight shafts 50 to move toward and away from pack 11. FIG. 11 shows the distal ends 55 of respective flight shaft 50 just contacting the opposed, longer sides of pack 11. As the flight assemblies 13, 14 are moved further across plates 22 and 22' by belts 31, 32, 37 and 38, the movement of the cam followers 56 along the cam track causes the rods 50 to move progressively towards pack 11, and progressively turn or rotate the pack. In FIG. 12, the pack 11 is starting to be rotated further about its center point 86. FIG. 13 shows flight assemblies 13, 14 moved further in the downstream direction of arrow A, with the pack 11 being further turned or rotated. At this position the pack 11 is rotated between opposite contact arms 88 and 88'(FIG. 18), mounted adjacent flight drive assemblies 13 and 14 respectively. Contact arms 88 and 88' are spring loaded and attached to a machine P stop switch (not shown) so that if a pack is pushed in one transverse direction or another sufficiently to contact and move either arm 88 or arm 88' sufficiently, the machine stop switch is activated to stop the machine. This prevents the machine from crushing a pack 11 if the pack 11 is not rotated, but pushed transversely, out of the center of conveyor C. FIG. 14 shows the pack 11 fully rotated, with opposing rods aligned with the longer sides of pack 11. In this position the blocks 45 and associated cam followers 56 are nearly at the apex 89 and 89' of cam tracks 70 and 71, respectively. FIG. 15 shows the fully rotated pack 11 moved further downstream from its position along conveyor C toward the downstream end 2 of machine P. At this longitudinal position, the respective cam followers 56 of linear blocks 45 are at the respective apex positions 89 and 89' of their associated cam tracks 70 and 71. Also at this position the turner rods 50 of flight assemblies 13 and 14 are positioned transversely to extend at the furthest lateral or transverse positions toward the opposing flight drive assembly, 10 or 12 and the centerline of conveyor C. The turner rods 50 in this position and the position shown in FIG. 14 assist in controlling the article packs 11 during higher machine speeds, such as 400-450 packs per minute. This turner rod 50 positioning of opposed flight assemblies 13,14 also stabilizes each article pack 11 as it continues to move downstream and prevents over turning by the turning pack's inertia.

Figure 16:
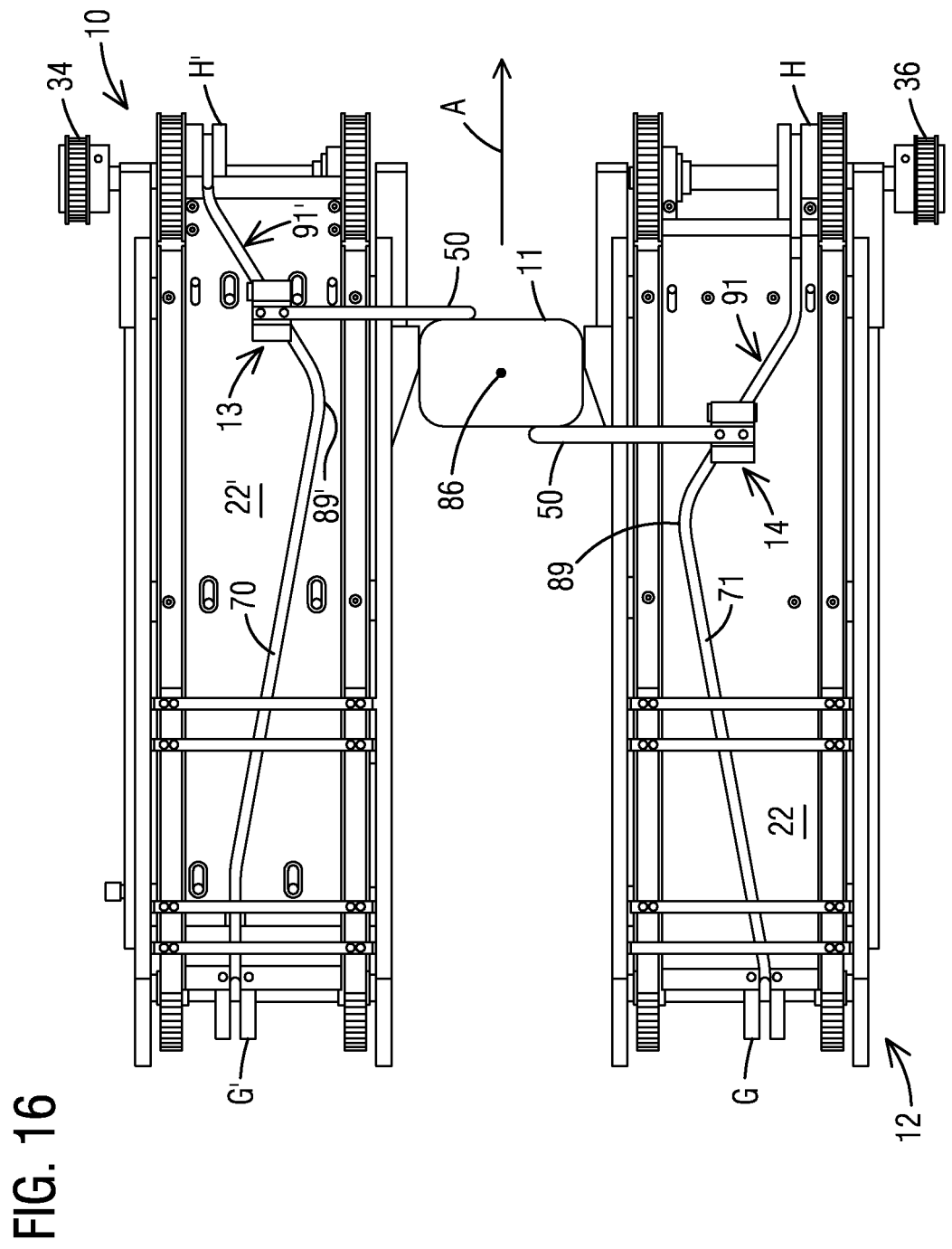
Figure 17:
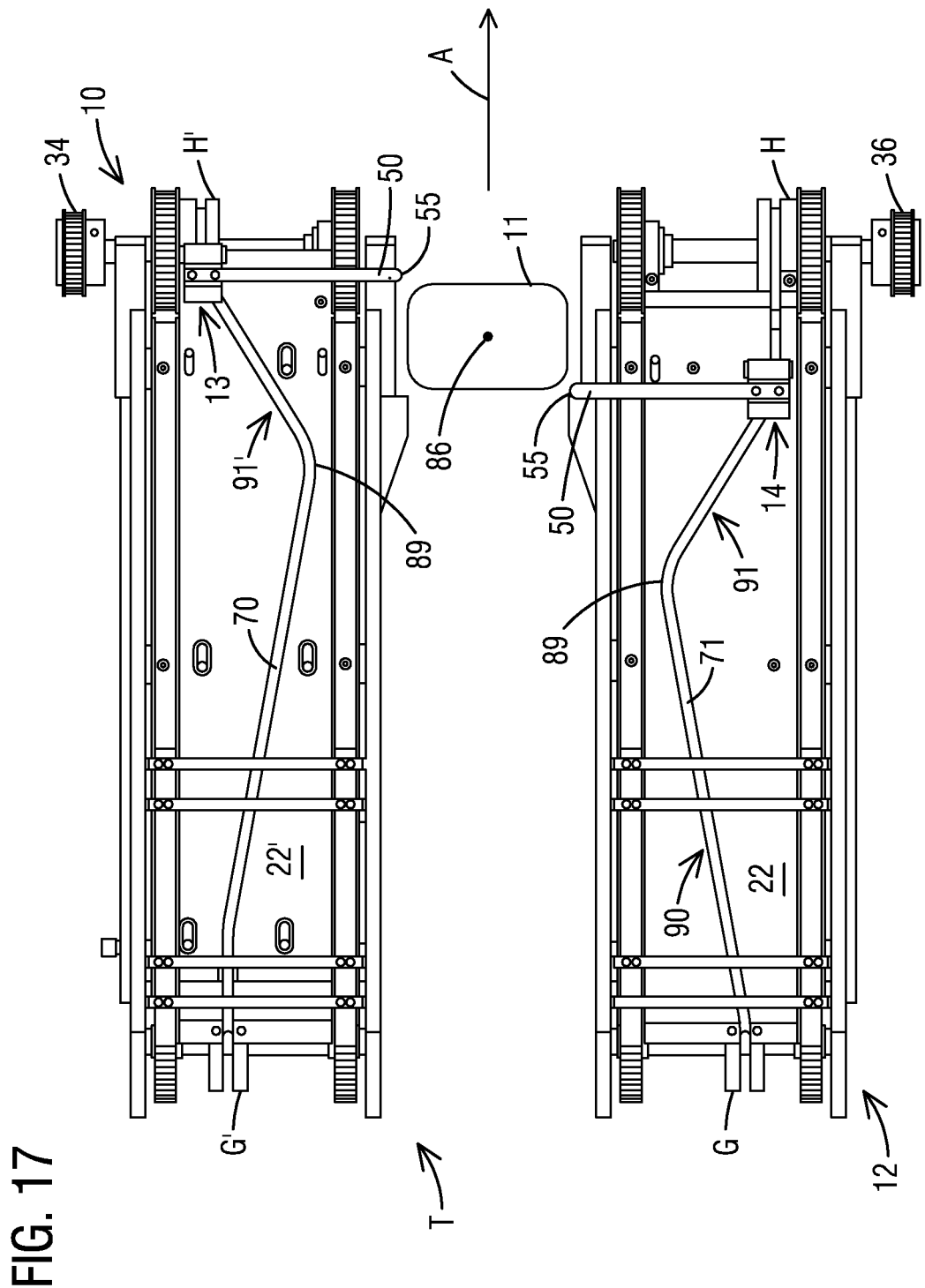

FIG. 16 shows the blocks 45 moved past the apex portions 89, 89' of cam tracks 70, 71. At these positions along cam tracks 70,71, the opposed turner rods 50 are caused to move with blocks 45 away from the centerline of conveyor C, so that turner rods 50 slide along the sides of pack 11 to prepare to release pack 11 from engagement with turner rods 50. FIG. 17 shows the turner rods 50 in nearly fully retracted positions, with the distal ends 55 of turner rods 50 being clear of the edges of pack 11. The turner rods 50 can be retracted even slightly further than shown in FIG. 17 to ensure that the ends 55 of the flight shafts do not contact packs 11 as the packs are moved downstream and away from turner assembly T, toward either a pack 11 diverter station or a pack 11 accumulation area (not shown).

Figure 19:
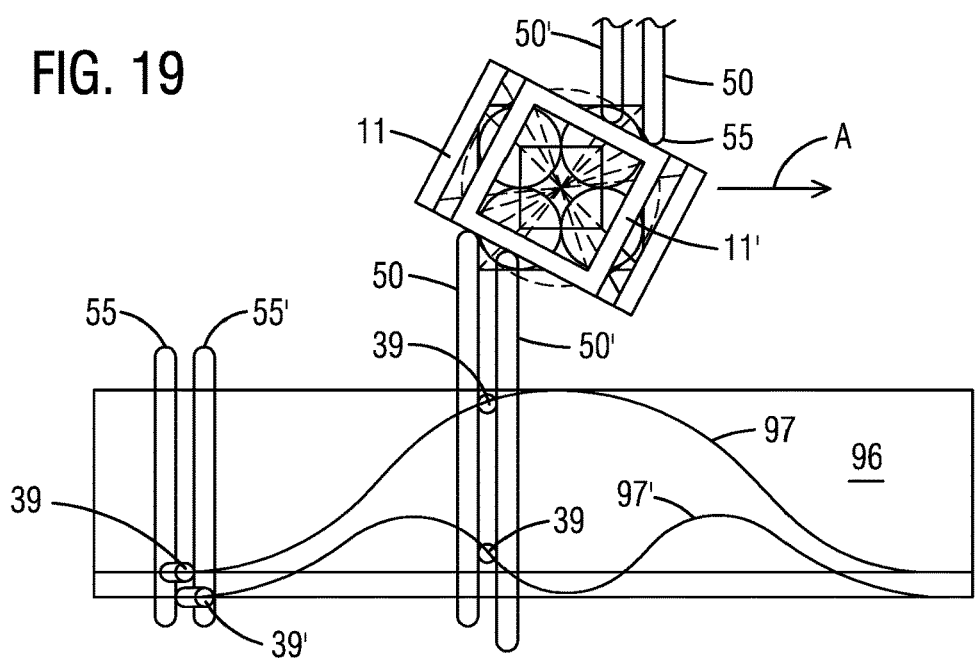
FIG. 19 is a schematic plan view of and alternate embodiment of the present invention used for turning square article packs.

As can be seen in FIGS. 11-17, the shape of cam tracks 70 and 71 in the plan view includes an initial sloping section 90 and 90', starting at cam follower guide G and G', and then towards the centerline of conveyor C and to apex positions 89 and 89'. Cam tracks 70 and 71 each then include a downstream sloping section 91 and 91' which both slope outwardly away from the centerline of conveyor C to guides H and H'. The length and angle of the cam tracks can be changed by changing cam plates in order to alter the speed of the article pack 11 turning. Also, the cam track profile can be similarly adjusted to change the rate of radial article pack rotation so that the rate can be reduced as the distal ends of the turner rods 50 approach being opposite each other. The guides H and H' guide the cam followers 56 from lower plates 22 and 22' to the cam tracks 92 and 92' (FIG. 19) defined in upper plates 21 and 21'. The guides G and G' guide cam followers 56 from the cam tracks 92 and 92' defined in upper plates 21, 21' to cam tracks 70 and 71, respectively, defined in lower plates 22 and 22'. As shown in FIG. 19, starting at guides H and H', the cam tracks 92 and 92' are shaped to include initial straight portions 95 and 95' that are aligned with guides H and H'. The cam tracks 92 and 92' then extend inwardly (that is toward the conveyor C centerline) by sloping portions 94 and 94' and then upstream straight portions 93 and 93', which align with guides G and G' respectively. The upper plate cam tracks 92 and 92' receive the respective cam followers 56 of each flight assembly 13,14 and those flight assemblies 13, 14 are driven around pulleys 25, 26, 25' and 26' and simultaneously through guides H and H' and back in the upstream direction, arrow A'. The inwardly sloping cam track sections, 94 and 94' cause the flight assemblies 13,14 to be moved slightly inwardly toward conveyor C, passing over the packs 11 that are moving on conveyor C in the downstream direction, arrow A. The cam followers 56 and their respective flight assemblies 13,14 then enter cam track sections 93 and 93', respectively and into their respective guides, G or G' as the flight assemblies are driven around pulleys or gears 23, 24, 23', 24'. After the cam followers of the flight assemblies pass around these pulleys at the upstream end of assemblies 10, 12, those cam followers 56 of flight assemblies 13, 14 then enter the cam track 70 for flight drive assembly 10 and cam track 71, for flight drive assembly 12. The flight drive assemblies 13, 14 are again positioned at the approximate starting positions 85 and 85' (FIGS. 11-17). It is possible to reverse the upper and lower cam plates so that the cam track moving the turner rods 50 toward the main conveyor C centerline is facing upwardly and the cam track moving the rods 50 away from the main conveyor C centerline is facing downwardly.

As these cam followers 56 simultaneously enter cam tracks 70, 71 at starting positions 85, 85', the process of progressively moving the flight assemblies 13, 14 toward the pack 11 as discussed herein, to eventually contact the pack 11 at points both ahead and behind the pack center point, and so turn or rotate the pack so that the longer side faces in the downstream direction.

Another embodiment of the present invention is used for tuning square article packs. FIG. 19 schematically illustrates a second type of flight assembly and associated cam tracks. All other elements of the present invention are the same as described above, except for the flight assemblies and the shape of the cam tracks. The second embodiment includes additional turner rod or rods 50, 50', such as two spaced, parallel turner rods on each flight assembly 13' and 14', both extending toward the main conveyor C centerline and the article pack or carton 11'. The turner rod 50 is positioned with its distal end 55 ahead of the distal end 55' of turner rod 50' toward the longitudinal center line of the main conveyor C. The alternate flight assemblies for turning square article packs may be utilized on each flight assembly 13, 14 of each flight drive assembly 10, 12 in order to pre-turn the packs. This embodiment is useful, to rotate packs that are square and so having sides or side walls of equal dimensions, such those carrying articles in a 2×2 or a 3×3 arrangement. This alternate embodiment effectively allows for pre-turning of the square pack by one of the pair of turner rods 50 and the adjacent rod 50' to complete the pack turn. These rods also can be controlled to move both toward and away from the main conveyor centerline (that is in the 'inward' direction and the 'outward' or transverse direction, respectively), to accomplish the pre-turning and proper positioning or squaring of the carton on its slat bed. Each rod 50, 50' includes separate cam followers 39, 39'. The cam plate 96 defines 2 cam tracks 97, 97', preferably in the shapes illustrated. The cam followers 39, 39', respectively, are driven though their associated cam tacks 97 and 97', so that the turner rod 50 is positioned ahead of turner rod 50' as the turner rods approach contact with article pack 11'. As the flight assemblies 13' and 14' are driven further downstream, the slope of the cam tracks (FIG. 19) brings the distal ends 55, 55' into alignment. FIG. 19 also schematically illustrates a rectangular article pack 11 (a "2×3" pack arrangement) for comparison of turning the packs 11, 11' in each embodiment.

What is claimed is:

1. A packaging machine for packaging articles into cartons, the packaging machine comprising:
   a carton blank feeder;
   a main conveyor;
   an article infeed station downstream of the feeder and adjacent to the main conveyor that extends downstream in a longitudinal direction for arranging articles in a desired configuration of an article group;
   an article wrap station for wrapping carton blanks around the article group to form a pack;
   a main packaging machine drive for moving the main conveyor, wherein the main conveyor moves the article pack downstream in the longitudinal direction; and
   an article pack turning station for rotating the article pack, the article pack turning station including two opposed flight drive assemblies, each flight drive assembly including a flight assembly having a turner rod that can be moved toward and away from the article pack in order to contact the pack in two areas, and each drive assembly including two cam plates, each cam plate defining a track and positioned adjacent to the main conveyor, wherein each cam plate includes an upper cam plate and an associated lower cam plate, the upper and associated lower cam plates being positioned over one another.

2. The packaging machine of claim 1, wherein a gap exists between each upper cam plate and the associated lower cam plate.

3. The packaging machine of claim 2, wherein the flight assemblies are arranged to pass between each upper cam plate and its associated lower cam plate.

4. The packaging machine of claim 1, wherein each drive assembly includes multiple flight assemblies.

5. The packaging machine of claim 4, wherein each of the multiple flight assemblies are spaced from and adjacent flight assembly.

6. The packaging machine of claim 4, wherein each drive assembly includes multiple flight assemblies and each of said multiple flight assembly passes over both the upper cam plate and the lower cam plate.

7. The packaging machine of claim 1, wherein each flight assembly includes a bearing block, and a flight shaft, each bearing block including a cam follower.

8. The packaging machine of claim 7, and each flight assembly including two, parallel flight shafts and wherein the bearing block contacts each of the two, parallel flight shafts and slides along each flight shaft toward and away from the main conveyor.

9. The packaging machine of claim 8, and the turner rod being attached to the bearing block.

10. The packaging machine of claim 9, wherein the turner rod moves toward and away from the main conveyor along with the bearing block.

11. The packaging machine of claim 7, and the flight drive assembly including sets of multiple gears and a drive belt connecting selected multiple gears.

12. The packaging machine of claim 11, and the flight drive assembly including sets of multiple gears attached to associated drive shafts, the drive belt passing over selected multiple gears, and wherein upon the rotation of the gears, the belts associated with each set of gears rotates to move each flight assembly in a closed loop over the upper cam plate and under the lower cam plate upon the rotation of the gears, and each cam follower being moved along each cam track of an upper cam plate and a lower cam plate to move a bearing block toward and away from the main conveyor.

13. The packaging machine of claim 12, wherein a set of gears is connected to a main packaging machine drive.

14. The packaging machine of claim 12, wherein a set of gears is connected to a servo motor.

15. The packaging machine of claim 12, wherein the cam tracks of the lower plates are curved so that their associated cam followers moving in the downstream direction cause the bearing block to move toward and away from the packaging machine main conveyor.

16. The packaging machine of claim 12, wherein the cam tracks of the upper plates are curved so that their associated cam followers moving in the downstream direction cause the bearing block to move toward and away from the packaging machine main conveyor.

17. The packaging machine of claim 12, wherein the cam tracks of the lower plates are curved so that their associated cam followers moving in the downstream direction cause the bearing block to move toward and away from the packaging machine main conveyor and wherein the cam tracks of the upper plates are curved so that their associated cam followers moving in the upstream direction cause the bearing block to move toward and away from the packaging machine main conveyor.

18. The packaging machine of claim 1, and the flight drive assembly including gears that are driven to rotate by the main packaging machine drive.

19. The packaging machine of claim 1, and the flight drive assembly including gears that are driven to rotate by a servo motor.

20. The packaging machine of claim 1, and the flight drive assembly including sets of multiple gears and a drive belt connecting selected multiple gears.

21. The packaging machine of claim 1 wherein the main conveyor is a rod conveyor, and slats for supporting the article packs carried by the main conveyor.

22. A packaging machine for packaging articles into cartons, the packaging machine comprising:
 a carton blank feeder;
 a main conveyor extending in a longitudinal direction from an upstream end of the packaging machine adjacent to the carton feeder toward a downstream end of the packaging machine;
 a main packaging machine drive for moving the main conveyor, an article infeed station adjacent to the main conveyor that feeds articles onto the main conveyor, the articles being formed into selected groups;
 an article wrap station for wrapping carton blanks around the article group to form an article pack, wherein the main conveyor moves the article pack downstream in the longitudinal direction; and
 an article pack turning station for rotating the article pack, the article pack turning station including two opposed flight drive assemblies, the flight drive assemblies being positioned adjacent to the main conveyor so that successive article packs pass in the downstream direction between each flight drive assembly, each drive assembly including two cam plates, each cam plate defining a track and positioned adjacent to the main conveyor, wherein each cam plate includes an upper cam plate and an associated lower cam plate, the upper and associated lower cam plates being positioned over one another, and each flight drive assembly including a flight assembly having a turner rod that can be moved toward and away from the article pack in order to contact the pack in two areas.

23. The packaging machine of claim 22, and each flight assembly having a flight shaft and a bearing block attached to the flight shaft, the turner rod being attached to the bearing block, each upper cam plate defining a cam track in its upper side and each lower cam plate defining a cam track in its lower side.

24. The packaging machine of claim 23, the flight drive assembly including two sets of gears, each of the sets of gears being connected by a shaft.

25. The packaging machine of claim 24, and wherein one set of gears are positioned at the downstream end of the flight assembly and another set of gears are positioned at the upstream end of the flight assembly, and drive belts connecting one gear positioned at the downstream end of the flight assembly to another gear positioned at the upstream end of the flight assembly.

26. A packaging machine for packaging articles into cartons, the packaging machine having a carton blank feeder, a main conveyor, an article infeed station downstream of the feeder and adjacent to the main conveyor that extends downstream in a longitudinal direction for arranging articles in a desired configuration of an article group, an article wrap station for wrapping carton blanks around the article group to form a pack, a main packaging machine drive for moving the main conveyor, wherein the main conveyor moves the article pack downstream in the longitudinal direction, and an article pack turning station for rotating the article pack, the article pack turning station including two opposed flight drive assemblies, each flight drive assembly including a flight assembly having a turner rod that can be moved toward and away from the article pack in order to contact the pack in two areas, an upper cam plate positioned over and spaced apart from a lower cam plate, the upper cam plate defining a cam track in its upper surface and the lower cam plate defining a cam track in its lower surface, the upper cam tracks and the lower cam tracks each including a curved portion, the flight drive assembly including a flight assembly having a flight shaft and a bearing block attached to the flight shaft, and a cam follower attached to the bearing block, said cam follower extending into a cam track, and the flight drive assembly having gears for moving the flight assembly in the downstream direction.

27. A packaging machine for packaging articles into cartons, the packaging machine comprising:
 a carton blank feeder;
 a main conveyor;
 an article infeed station downstream of the carton blank feeder and adjacent to the main conveyor that extends downstream in a longitudinal direction for arranging articles in a desired configuration of an article group;
 an article wrap station for wrapping carton blanks around the article group to form an article pack;
 a main packaging machine drive for moving the main conveyor, wherein the main conveyor moves the article pack downstream in the longitudinal direction; and
 an article pack turning station for rotating the article pack, the article pack turning station including two opposed flight drive assemblies, each flight drive assembly including a flight assembly having a turner rod that can be moved toward and away from the article pack in order to contact the pack in two areas, and each flight drive assembly including a cam follower operatively connected to a respective turner rod, an upper cam plate and a lower cam plate, the upper cam plate being positioned above the lower cam plate, each upper cam plate defining an upper cam track and each lower cam plate defining a lower cam track, each lower cam track is curved such that a respective cam follower received in the lower cam track and moving in the downstream direction causes the respective turner rod to move toward and away from the packaging machine main conveyor.

28. The packaging machine of claim 27, wherein each flight assembly includes a first guide at an upstream end and a second guide at a downstream end, the first guide and the second guide allow the cam follower to transition between the lower cam track in the lower plate and the upper cam track in the upper cam plate.

29. The packaging machine of claim 27, wherein the upper cam track includes a first straight portion, a second straight portion, and a sloping portion extending between the first straight portion and the second straight portion so that the second straight portion is offset from the first straight portion.

30. The packaging machine of claim 27, wherein the upper cam track is curved so that a respective cam follower received in the upper cam track and moving in the upstream direction causes the respective turner rod to move toward and away from the packaging machine main conveyor.

* * * * *